US006935774B2

(12) United States Patent
Fujii et al.

(10) Patent No.: US 6,935,774 B2
(45) Date of Patent: Aug. 30, 2005

(54) TIMEPIECE EXTERNAL PART AND METHOD OF MANUFACTURING THE PART

(75) Inventors: Kouji Fujii, Tokorozawa (JP); Junji Satoh, Kawagoe (JP); Hitoshi Uchida, Kodaira (JP); Norio Hashimoto, Sayama (JP); Ryo Fujita, Tokyo (JP)

(73) Assignee: Citizen Watch Co. Ltd., Tokyo (JP)

( * ) Notice: Subject to any disclaimer, the term of this patent is extended or adjusted under 35 U.S.C. 154(b) by 0 days.

(21) Appl. No.: 10/490,288

(22) PCT Filed: Sep. 12, 2002

(86) PCT No.: PCT/JP02/09374

§ 371 (c)(1),
(2), (4) Date: Mar. 22, 2004

(87) PCT Pub. No.: WO03/027777

PCT Pub. Date: Apr. 3, 2003

(65) Prior Publication Data

US 2004/0233795 A1 Nov. 25, 2004

(30) Foreign Application Priority Data

Sep. 21, 2001 (JP) ....................................... 2001-288392

(51) Int. Cl.$^{7}$ .......................... A44C 5/00; G04B 37/00; G04B 29/00; C21D 21/00; B23K 35/36

(52) U.S. Cl. ....................... 368/280; 368/281; 368/285; 368/319; 148/528; 148/559; 148/668; 228/175; 228/262.7; 228/262.9

(58) Field of Search .......................... 368/88, 280, 281, 368/285, 319; 148/516, 528, 559, 668; 228/175, 227, 234.1, 262.7, 262.9

(56) References Cited

U.S. PATENT DOCUMENTS

| | | | | |
|---|---|---|---|---|
| 4,146,165 A | | 3/1979 | Lesgourgues et al. | |
| 4,479,725 A | * | 10/1984 | Koide et al. | 368/292 |
| 4,496,248 A | * | 1/1985 | Waki et al. | 368/280 |
| 4,777,098 A | * | 10/1988 | Takamura et al. | 428/664 |
| 5,557,587 A | * | 9/1996 | Tosaka et al. | 368/282 |
| 6,027,575 A | | 2/2000 | Paruchuri et al. | |
| 6,762,976 B1 | * | 7/2004 | Tamaru et al. | 368/88 |

FOREIGN PATENT DOCUMENTS

| | | |
|---|---|---|
| JP | 55-20403 | 2/1980 |
| JP | 55-120803 | 9/1980 |
| JP | 55-161293 | 11/1980 |
| JP | 56-103380 | 8/1981 |
| JP | 59-075181 | 4/1984 |
| JP | 60-228666 | 11/1985 |
| JP | 61-160685 | 8/1986 |
| JP | 63-168585 | 7/1988 |
| JP | 4-43288 | 4/1992 |
| JP | 5-23871 | 2/1993 |
| JP | 5-220849 | 8/1993 |
| JP | 2000-271675 | 10/2000 |
| JP | 2001-147280 | 5/2001 |
| WO | WO 02/23283 | 3/2002 |

* cited by examiner

*Primary Examiner*—Vit W. Miska
(74) *Attorney, Agent, or Firm*—Westerman, Hattori, Daniels & Adrian, LLP

(57) ABSTRACT

A wristwatch case (11) and a method of manufacturing the case, the wristwatch case comprising a wristwatch case body (1) made of titanium or stainless steel and a crown pipe (3) fixed to each other, wherein a stem hole (2) corresponding to the crown pipe (3) is formed in the wristwatch case body (1), a small diameter part is formed in the crown pipe (3), and a small diameter part corresponding to the a small diameter part of the crown pipe is formed in the stem hole (2), the method comprising the step of fitting the crown pipe (3) into the stem hole (2) in the wristwatch case body (1) to form a solid phase diffusion joining part at a portion where the small diameter parts thereof are fitted closely to each other, and to form a brazed connection part at a portion other than that where the small diameter parts are fitted closely to each other, whereby a watch external part having excellent corrosion resistance and waterproof and a large number of design variations can be provided.

37 Claims, 8 Drawing Sheets

TIMEPIECE EXTERNAL PART AND METHOD OF MANUFACTURING THE PART

TECHNICAL FIELD

This invention relates to a decorative article of a wristwatch, made of a metal such as titanium, titanium alloy, stainless steel, and so forth, that is sturdy in construction, and is excellent in corrosion resistance as well as waterproof, having design variation in abundance, and also to a method of manufacturing the same.

BACKGROUND TECHNOLOGY

For decorative articles of a wristwatch (hereinafter referred to also as "wristwatch parts"), such as a wristwatch case, and so forth, heavy use has thus far been made of titanium (hereinafter "titanium" includes pure titanium, and titanium alloy) and stainless steel as the constituent material thereof. In particular, a share of titanium for use in the wristwatch parts has lately increased because of its sturdiness, excellent corrosion resistance, light weight, and good biocompatibility causing no allergic reaction to metal to occur to a human body. Further, titanium has been in widespread use not only for wristwatches but also in various industrial sectors in order to utilize its excellent characteristics such as light weight, high strength, and excellent corrosion resistance.

A pure titanium crystal is hexagonal close-packed structure at room temperature, but turns into a body-centered cubic structure at a temperature not lower than 882° C., that is, the transformation point thereof (temperature at which transformation occurs). Accordingly, if this temperature (that is, 882° C.) is exceeded in the process of manufacturing a wristwatch part, a surface condition of the wristwatch part undergoes a change following transformation of its crystals, so that re-polishing and so forth needs to be performed. Because of a risk of an increase in the number of process steps to that extent, it is regarded desirable to treat titanium at a temperature not higher than the transformation point thereof.

Meanwhile, as stainless steel is moderately weighty, and excellent in corrosion resistance, it is most widely used as the constituent material of wristwatch parts. Various kinds of stainless steels are available, but as the constituent material of the wristwatch parts, much use is being made of an austenitic stainless steel such as SUS 304, SUS 316L, and so forth from the viewpoint of corrosion resistance.

Now, a conventional wristwatch case as a wristwatch part is generally manufactured by forming a wristwatch case body integrally with an end-piece (the end-piece is a part for linking a watch band with the wristwatch case body). In such a case, it is difficult to manufacture parts of a complex design by a forging method in comparison with a case of using a casting method, however, it has lately become a general practice to manufacture the wristwatch parts by the forging method such as hot forging, cold forging, and so forth.

Further, with reference to the wristwatch parts, there has lately increased a demand from a design point of view for providing diverse variation in surface finishing thereof by applying surface processing such as mirror finishing, hair-line finishing, honing, and so forth on a portion-by-portion basis. Herein, the mirror finishing means shining mirror finish by polishing, and the hair-line finishing means surface finishing with minute hair-line-like directional lines. The honing means surface finishing with fine asperities, avoiding use of plating, and is also called mat. For example, in the case of a wristwatch case, there is a demand for application of combined surface finishing by applying the honing to a wristwatch case body, and the mirror finishing to an end-piece to thereby vary surface finishing by portions of the wristwatch case. Further, as to the wristwatch parts, there is also a demand for exhibiting diverse variation such as color variation, pattern variation, and so forth by applying a film-depositing process such as plating, IP (ion plating), or coating besides applying the surface processing.

However, the wristwatch parts each are small in whole size, so that, for example, in the case of a wristwatch case, if the wristwatch case is manufactured by integrating an end-piece with a wristwatch case body at the outset, it will become extremely difficult to finish up the surface thereof beautifully (by exhibiting variation in surface finishing) by applying thereafter the surface processing and film-depositing process, varying by portions. There is also a case where an end-piece of a wristwatch case is desired to exhibit a design feature by forming the end-piece in a complex shape, and in such a case as well, if the wristwatch case is manufactured by integrating the end-piece with the wristwatch case body at the outset, it will become difficult to work on the end-piece later.

Accordingly, in case there is a strong demand from a design point of view for manufacturing the wristwatch case with variation in the surface finishing or for providing the wristwatch case with a design feature by forming the end-piece into a complex shape, the wristwatch case body and the end-piece are separately formed, and processing as desired is applied thereto, respectively, to be thereby integrated with each other by engaging one with the other or connecting together. By so doing, processing as desired can be applied to respective parts of the wristwatch case, so that the wristwatch case is provided with design variation in abundance.

In the case of bringing the end-piece into engagement with the wristwatch case body, there is available a method whereby a pin is pressed inbetween the wristwatch case body and the end-piece, and both parts are engaged with each other through the intermediary of the pin. This method, however, has a drawback in that it is difficult to maintain a condition of engagement of the wristwatch case body with the end-piece over an extended period of time, resulting in low reliability in respect of durability. Furthermore, with the method, it is difficult to render the pin used for engaging both the parts with each other to be invisible from outside, so that the method has another drawback in that there is the risk of a design feature of a wristwatch case being detracted due to visibility of the pin from outside.

Further, for connecting the end-piece with the wristwatch case body, methods of brazing using a brazing filler metal and welding are available. Brazing has a problem of brazing filler metal flow, however, with this method, surface finishing even after connecting the wristwatch case body with the end-piece can be relatively excellent. However, brazing has a shortcoming in respect of corrosion resistance at connection portions. As described above, in the case of using titanium as the constituent material of the wristwatch case body and the end-piece, when attempting connection of both the parts at a temperature not higher than the transformation point of titanium, it is not possible to find a brazing filler metal that is fully suitable for the purpose. Above all, silver solder (for example, JIS: BAg—8, and so forth) is appropriate. However, since the silver solder has very poor corrosion resistance, there is the risk of discoloration, rust, etc. occurring to connected parts with the passage of long time after connection, thereby considerably impairing visual quality of the wristwatch case.

Meanwhile, some wristwatch parts require high waterproof. However, particularly with the wristwatch case, it is difficult to maintain waterproof on a long term basis upon connection of the wristwatch case body with a crown pipe, so that there exists a problem unavoidable from a structural point of view in that reliability in respect of waterproof is prone to deteriorate.

In the case of the wristwatch parts, respective parts can be also connected with each other by welding besides brazing. If connected by welding, however, burn-like marks are left out, thereby impairing visual decorativeness. Among others, projection welding is available for melting minute juts called projections, but the applicable parts are limited because parts to be welded undergo, for example, a change in size (shape) upon welding, thereby imposing restriction on the wristwatch parts from a design point of view.

Thus, the conventional wristwatch parts used to have various problems in the case where the respective parts (for example, the wristwatch case body, the end-piece, crown pipe, etc.) are formed individually, surface finishing as desired is applied thereto, respectively, and those parts are subsequently integrated with each other by engagement or connection with each other. That is, in such a case, it has been extremely difficult to provide the wristwatch parts with not only sturdiness sufficient to maintain for long duration a condition in which the respective parts are integrated with each other by engagement or connection but also corrosion resistance as well as waterproof while keeping visual decorativeness in excellent state.

The invention has been developed in order to resolve such problems as described, encountered by the conventional wristwatch parts, and it is an aspect of the invention to provide a decorative article of a wristwatch, made up of two or more parts such as a wristwatch case made up of a wristwatch case body and an end-piece, and a method of manufacturing the same, wherein there are provided not only sturdiness sufficient to be able to maintain a condition of engagement or connection of the respective parts with each other for long duration but also corrosion resistance as well as waterproof while keeping visual decorativeness in excellent state, and having design variation in abundance.

DISCLOSURE OF THE INVENTION

In accordance with the invention, there is provided a decorative article of a wristwatch, having a construction in which a first part is fixedly attached to a second part, wherein a solid phase diffusion joining portion and a brazed connection portion are formed in a portion where the second part is in intimate contact with the first part.

Further, in accordance with the invention, there is provided a decorative article of a wristwatch, having a construction in which a first part is fixedly attached to a second part, wherein a hole portion corresponding to the second part is formed in the first part, and a solid phase diffusion joining portion and a brazed connection portion are formed in a portion where the second part is fitted into, and is in intimate contact with the hole portion.

Preferably, with the decorative article of a wristwatch, the second part has a small diameter portion while the hole portion has a small diameter portion corresponding to the small diameter portion of the second part, and the solid phase diffusion joining portion is formed in a portion where the small diameter portion of the second part is in intimate contact with the small diameter portion of the hole portion, the brazed connection portion being formed in a portion other than the portion where the small diameter portion of the second part is in intimate contact with the small diameter portion of the hole portion.

Still further, in accordance with the invention, there is provided a decorative article of a wristwatch, having a construction in which a first part is fixedly attached to a second part, wherein a recess is formed in the first part while a protrusion corresponding to the recess is formed in the second part, and a solid phase diffusion joining portion and a brazed connection portion are formed in a portion where the protrusion is fitted into, and is in intimate contact with the recess.

With the decorative article of a wristwatch, a third part in intimate contact with the recess and the protrusion is preferably provided, and the solid phase diffusion joining portion is preferably formed in portions where the third part is in intimate contact with the recess and the protrusion, respectively, while the brazed connection portion is preferably formed in a portion where the protrusion is in intimate contact with the recess.

Preferably, a metal film is deposited on respective surfaces of the protrusion, and the protrusion is in intimate contact with the recess through the intermediary of the respective metal films.

Further, with the decorative article of a wristwatch, the constituent material of the first part and the second part, is preferably either stainless steel or titanium.

There may be either a case where the first part is a wristwatch case body and the second part is a crown pipe or a case where the first part is a wristwatch case body and the second part is an end-piece.

Still further, the brazed connection portion is preferably formed with a low-melting brazing filler metal.

Preferably, the brazed connection portion is formed with a brazing filler metal mainly containing palladium, platinum, nickel, and phosphorus, or a brazing filler metal mainly containing palladium, copper, nickel, and phosphorus.

Further, the brazed connection portion may be formed with a brazing filler metal mainly containing gold, silver, copper, germanium, and palladium.

Still further, the brazed connection portion may be formed with a brazing filler metal mainly containing gold, silver, copper, palladium, and nickel, and also containing at least one of gallium, indium, and tin.

The invention further provides a method of manufacturing a decorative article of a wristwatch by fixedly attaching a first part to a second part, comprising a step of feeding a brazing filler metal on the second part, and a step of forming a solid phase diffusion joining portion and a brazed connection portion in a portion where the second part is in intimate contact with the first part.

Further, the invention provides a method of manufacturing a decorative article of a wristwatch by fixedly attaching a first part to a second part, comprising a step of feeding a brazing filler metal on the second part, a press-contact step of pressing the first part into contact with portions of the second part other than a portion, with the brazing filler metal fed thereon, a face-to-face contact step of bringing the portion of the second part with the brazing filler metal fed thereon, into face-to-face contact with the first part, and an annealing step of heating the first part and second part after the press-contact step and the face-to-face contact step.

Still further, the invention provides a method of manufacturing a decorative article of a wristwatch by fixedly attaching a first part to a second part, comprising, a step of feeding a brazing filler metal on the second part; a press-contact step of pressing a third part into contact with a portion of the second part other than a portion thereof, with the brazing filler metal fed thereon and with the first part, a face-to-face contact step of bringing the portion of the second part with the brazing filler metal fed thereon, into face-to-face contact with the first part, and an annealing step of heating the first part, second part, and third part after the press-contact step and the face-to-face contact step.

The press-contact step may be executed by press-fitting the second part into the first part. Further, the press-contact step may also be executed by press-fitting the third part into the first part and second part.

The step of feeding the brazing filler metal is preferably executed by feeding the brazing filler metal in a paste state by use of a dispenser.

Further, in the case where titanium is used as the constituent material of the first part and the second part, a temperature for heating in the annealing step is preferably in a range of about 600° C. to 850° C.

Still further, in the case where stainless steel is used as the constituent material of the first part and the second part, a temperature for heating in the annealing step is preferably in a range of about 600° C. to 900° C.

Yet further, a step of depositing a metal film on portions of the second part other than the portion thereof on which the brazing filler metal is to be fed, may be provided prior to the step of feeding the brazing filler metal on the second part.

BEST MODE FOR CARRYING OUT THE INVENTION

Best mode for carrying out a decorative article of a wristwatch and a method of manufacturing the same according to the invention, are described hereinafter with reference to the accompanying drawings.

Figure 1:
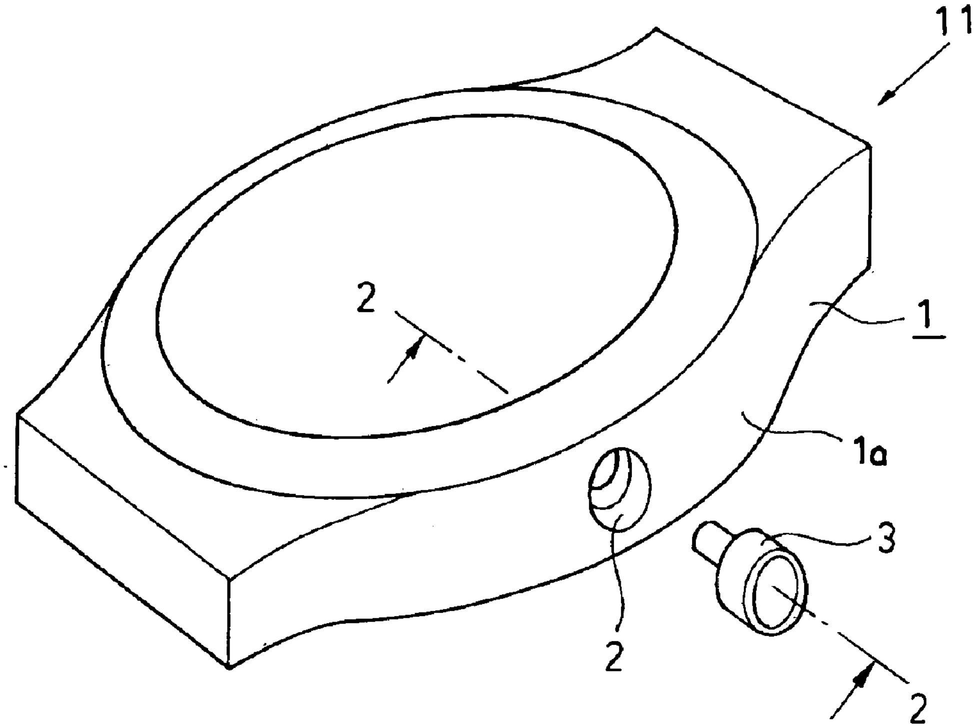
FIG. 1 is a perspective view of a wristwatch case showing a wristwatch case body and a crown pipe, as exploded.
Figure 2:
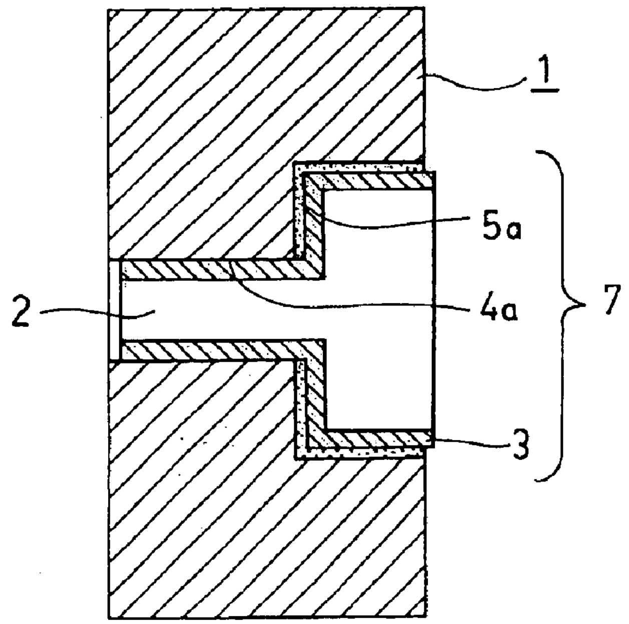
FIG. 2 is a sectional view of a portion formed by bringing the crown pipe into intimate contact with the wristwatch case body, taken on line 2—2 of FIG. 1.
Figure 9:
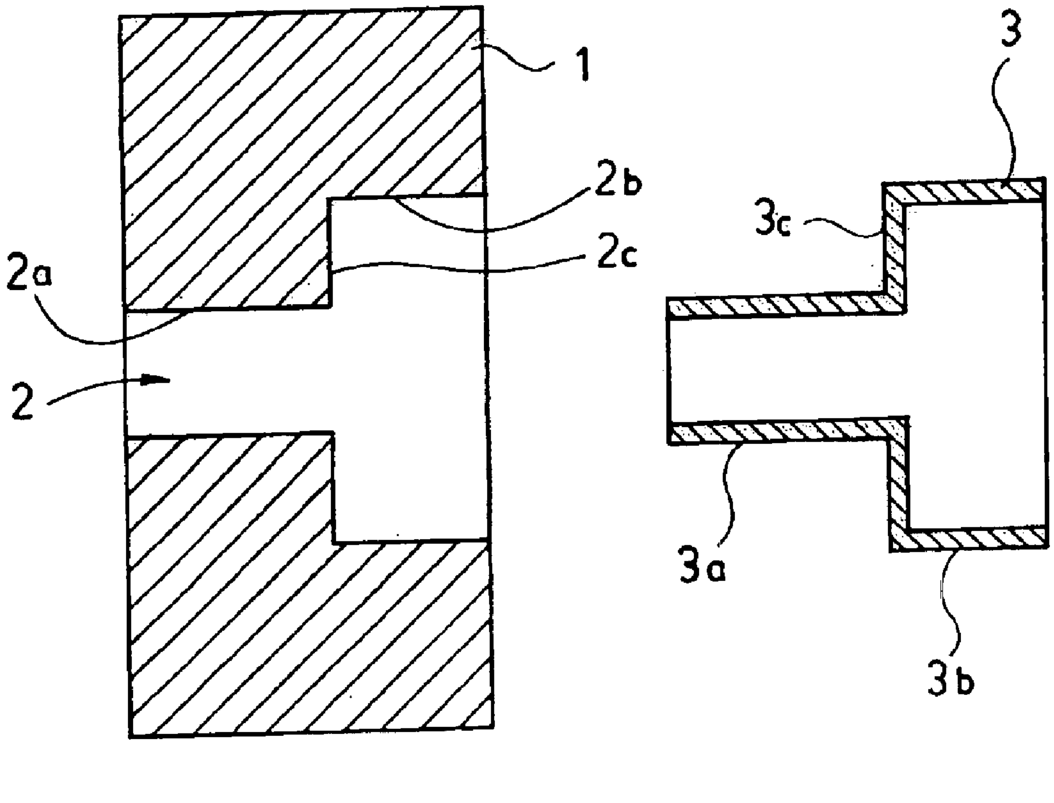
FIG. 9 is a sectional view showing a section taken on line 2—2 of FIG. 1, by omitting parts thereof.

First Embodiment (FIGS. 1, 2, AND 9)

1) The Whole Construction of a Decorative Article of a Wristwatch

First, as a first embodiment of a decorative article of a wristwatch and a method of manufacturing the same according to the invention, a wristwatch case 11 shown in FIG. 1 is described. The wristwatch case 11 is a decorative article of a wristwatch, and is manufactured by fixedly attaching a wristwatch case body 1 as a first part to a crown pipe 3 as a second part. The wristwatch case 11 is characterized in that two connection portions, that is, a solid phase diffusion joining portion 4*a* and a brazed connection portion 5*a*, as described later in the description, are formed at an intimate contact portion 7 where the crown pipe 3 is in intimate contact with the wristwatch case body 1. FIG. 1 is a perspective view of the wristwatch case 11 showing the wristwatch case body 1 and the crown pipe 3, as exploded. FIG. 2 is a sectional view of the portion 7 formed by bringing the crown pipe 3 into intimate contact with the wristwatch case body 1, taken on line 2—2 of FIG. 1. FIG. 9 is a sectional view showing a section taken on line 2—2 of FIG. 1, which is partly omitted.

The wristwatch case body 1 has a housing space for housing a movement, a dial, and so forth, inside a sidewall portion 1*a* thereof, and a stem hole 2 is formed in the sidewall portion 1*a*. The stem hole 2 is bored in a shape corresponding to the crown pipe 3, and is formed so as to link the housing space of the wristwatch case body 1 with outside. Further, the stem hole 2 has a small diameter portion 2*a* on the inner side thereof and a larger diameter portion 2*b* on the outer side thereof, with an annular butting surface 2*c* provided therebetween. The small diameter portion 2*a*, larger diameter portion 2*b*, and butting surface 2*c* compose a hole portion corresponding to the outer shape of the crown pipe 3.

The crown pipe 3 is a cylindrical part for use in attaching a crown (not shown) to the wristwatch case body 1 in order to ensure waterproof, and has a small diameter portion 3*a* and a larger diameter portion 3*b*, an annular butting surface 3*c* being provided between the small diameter portion 3*a* and the larger diameter portion 3*b*. The small diameter portion 3*a* is formed in a shape corresponding to the small diameter portion 2*a* of the stem hole 2, but is slightly larger in diameter than the small diameter portion 2*a*.

2) A Method of Manufacturing the Decorative Article of the Wristwatch

The wristwatch case 11 is manufactured by feeding a suitable amount of low-melting brazing filler metal paste on the butting surface 3*c* of the crown pipe 3 beforehand, and pushing the crown pipe 3 into the stem hole 2 with a strong force applied from outside. That is, the wristwatch case 11 is manufactured by press-fitting the crown pipe 3 into the winding stem hole 2. Thereupon, the periphery of the small diameter portion 3*a* comes into face-to-face contact (is pressed into contact) with the inner circumferential surface of the small diameter portion 2*a* with stress acting on the contact portion while the butting surface 3*c* and the butting surface 2*c* face each other, thereby forming the intimate contact portion 7. At this time, the brazing filler metal fed on the butting surface 3*c* is spread evenly to a degree in a gap between the butting surface 3*c* of the crown pipe 3 and the butting surface 2*c* (partly in a gap between the larger diameter portion 3*b* and the larger diameter portion 2*b*). Then, in that state, the wristwatch case 11 and the crown pipe 3 are placed in a vacuum apparatus (not shown), and an annealing process for heating them in a vacuum atmosphere is applied. Whereupon solid phase diffusion joining and brazing concurrently proceed, so that the wristwatch case body 1 and the crown pipe 3 are fixedly attached to each other to be thereby integrated.

3) Construction of the Connection Portions of the Decorative Article of the Wristwatch As a result of manufacturing the wristwatch case 11 as above, there are formed the solid phase diffusion joining portion 4*a* and the brazed connection portion 5*a*.

The solid phase diffusion joining portion 4*a* is formed at a face-to-face contact portion between the small diameter portion 2*a* and the small diameter portion 3*a*. Herein, the solid phase diffusion connection means connection of objects that occurs at a temperature not higher than a melting point thereof by butting the objects for the connection against each other and applying pressure and heat to a degree hardly causing plastic deformation so as to be able to utilize diffusion of atoms occurring between connection surfaces. At the solid phase diffusion joining portion 4*a*, the small diameter portion 2*a* is in face-to-face contact with the small diameter portion 3*a* and at an interface therebetween, there occurs micro-diffusion of the constituent material (for example, titanium) of the respective portions, on an atomic level, causing internal diffusion of oxygen of an oxide film existing at the outset to thereby form a solid solution. Even if microscopic asperities exist on the interface in the initial stage of the connection, and microscopic gaps attributable to the asperities exist on the interface, such gaps will gradually become smaller along with progress in the micro-diffusion and substantially disappear at the end. In such a state, the interface will no longer permit even steam to pass therethrough. Thus, the face-to-face contact portion between the small diameter portion 2*a* and the small diameter portion 3*a* is connected tightly and strongly with no gap in-between, thereby forming the solid phase diffusion joining portion 4*a*.

The brazed connection portion 5*a* is formed by the low-melting brazing filler metal in the paste state, fed on the butting surface 3*c*, being spread in a gap between the crown pipe 3 and the stem hole 2 upon press-fitting the winding crown pipe 3 into the latter. The low-melting brazing filler metal melts in an annealing process for heating the wristwatch case body 1 and the crown pipe 3, and is spread so as to fill up microscopic gaps between the butting surfaces 2*c* and 3*c* in a face-to-face contact portion due to capillarity (partly spread also in a gap between the larger diameter portion 2*b* and the larger diameter portion 3*b*). Thereupon, since the butting surfaces 2*c* and 3*c* are formed in such a way as to surround the small diameter portions 2*a* and 3*a*, the brazed connection portion 5*a* is formed in such a way as to surround the solid phase diffusion joining portion 4*a*. Thus, the wristwatch case body 1 and the crown pipe 3 are connected to each other.

Herein, "the low-melting brazing filler metal" means a brazing filler metal which melting point is lower than the transformation point or crystallization temperature of the constituent material of parts to be brazed, having no effect on a finished condition of the surfaces of the parts to be brazed even after connection thereof by brazing.

Since the crown pipe 3 is fixedly attached to the wristwatch case body 1 by providing the solid phase diffusion joining portion 4*a*, internal waterproof of the wristwatch case 11, including hermeticity thereof, is maintained in an excellent condition with a fairly high probability. In order to provide the solid phase diffusion joining portion 4*a*, portions to be connected (the small diameter portions 2*a* and 3*a*) need be in intimate contact with each other with no gap in-between. However, in some rare cases, the small diameter portions 2*a* and 3*a* have poor surface accuracy for some reason, so that both the portions are not exactly circular in cross section, or the inner circumferential surface of the small diameter portion 2*a* is not smooth due to adhesion and so forth occurring when forming the stem hole 2 by boring with a drill. In such cases, even if the crown pipe 3 is press-fitted into the wristwatch case body 1, the small diameter portions 2*a* and 3*a* will not come into intimate contact with each other, raising a risk that the solid phase diffusion joining portion 4*a* cannot be formed with reliability. Then, there is no denying a possibility that the waterproof of the wristwatch case 11 becomes insufficient.

For this reason, with the wristwatch case 11, while the solid phase diffusion joining portion 4*a* is formed at the face-to-face contact portion between the small diameter portions 2*a* and 3*a*, the brazed connection portion 5*a* is formed on the outer side of the wristwatch case 11 in such a way as to surround the solid phase diffusion joining portion 4*a*. Thus, even in case that the solid phase diffusion joining portion 4*a* is not formed with reliability, the wristwatch case 11 obtains sturdiness and perfect waterproof by implementing connection with no gap in-between by use of the brazing filler metal applied on the outer side thereof.

4) Working examples of the decorative article of the wristwatch

As the embodiment of the decorative article of the wristwatch according to the invention, specific working examples (samples) of the wristwatch case 11 having such a construction as described in the foregoing were manufactured.

WORKING EXAMPLE 1

With this working example, a wristwatch case 11 was manufactured by fixedly attaching a wristwatch case body 1 made of pure titanium to a crown pipe 3 made of a titanium alloy (Ti-6Al-4V). A stem hole 2 of the wristwatch case body 1 has a small diameter portion 2*a* of about 1.80 mm ϕ in the bore, and the crown pipe 3 had a small diameter portion 3*a* of 1.83 mm ϕ in outside diameter. Accordingly, a press-fit allowance (difference in size between parts involved in press-fitting) at the time of press-fitting the crown pipe 3 into the stem hole 2 was 1.83 mm ϕ−1.80 mm ϕ=0.03 mm ϕ, that is, 30 μm. Thus, the outside diameter of the small diameter portion 3*a* was rendered slightly larger than the bore of the small diameter portion 2*a* so as to enable the crown pipe 3 to be press-fitted into the stem hole 2.

Further, with this working example, in order to form a brazed connection portion 5*a*, use was made of a Pd—Pt—Ni—P base brazing filler metal in a paste state, mainly containing palladium, platinum, nickel, and phosphorus with a composition ratio of Pd:Pt:Ni:P at 34:53:8:5 (wt. %). The brazing filler metal is a low-melting brazing filler metal which melting point is lower than the transformation point of the constituent material (with this example, titanium) of the wristwatch case body 1 and the crown pipe 3, the melting point thereof being at about 699° C. The brazing filler metal may not be in a paste state, however, use of the brazing filler metal in the paste state is preferable because it is easier to handle if the same is in the paste state. The brazing filler metal was fed on a butting surface 2*c* of the stem hole 2 or a butting surface 3*c* of the crown pipe 3 by dropping about 2$\mu$ liter thereof, using a dispenser.

After press-fitting the small diameter portion 3*a* of the crown pipe 3 into the small diameter portion 2*a* of the stem hole 2, the wristwatch case body 1, together with the crown pipe 3, was housed in a vacuum apparatus (not shown). A pressure inside the vacuum apparatus was maintained at around $5\times10^{-6}$ Torr (about $6.7\times10^{-4}$ Pa) to produce a vacuum atmosphere, and then annealing was applied in the apparatus. A temperature (annealing temperature) applied at the annealing was set at about 750° C., and time for applying the annealing (annealing time) was set to on the order of one hour. By applying the annealing, two connection portions, that is, a solid phase diffusion joining portion 4*a* and a brazed connection portion 5*a* were formed, whereupon the crown pipe 3 was fixedly attached to the wristwatch case body 1.

In order to form the solid phase diffusion joining portion 4*a*, it is necessary to secure the press-fit allowance of a certain magnitude, at the time of press-fitting the crown pipe 3 into the stem hole 2, and also to maintain a certain temperature as the annealing temperature. The press-fit allowance and annealing temperature vary depending on the constituent material and size of the wristwatch case 11 and the crown pipe 3, so that both the press-fit allowance and annealing temperature are adjusted so as to enable the solid phase diffusion joining portion 4*a* to be formed.

As is evident from Working Example 1, in the case of connecting metallic parts made of titanium, the annealing temperature is preferably in a range of about 600° C. to 850° C. The annealing temperature lower than 600° C. is undesirable because there is a risk that the brazing filler metal used in brazing does not melt sufficiently and fails to fill up the gaps completely. Also, in that case, there is a possibility that sufficient diffusion does not occur at the solid phase diffusion joining portion 4*a*, and microscopic cavities are left out at the interface thereof, resulting in insufficient strength. On the other hand, the annealing temperature in excess of 850° C. is undesirable either because, in that case, the annealing temperature is close to the transformation point of titanium, so that the surface condition of a wristwatch case may a change. Incidentally, the wristwatch case 11 manufactured according to Working Example 1 is referred to as a test piece C.

WORKING EXAMPLE 2

Next, a wristwatch case body 1 was connected to a crown pipe 3 with a brazing filler metal different from the brazing filler metal used for Working Example 1. With this working example, use was made of a Pd—Cu—Ni—P base brazing filler metal in a paste state, mainly containing palladium, copper, nickel, and phosphorus with a composition ratio of Pd:Cu:Ni:P at 78:4:11:7 (wt. %). This brazing filler metal as well is a low-melting brazing filler metal which melting point is lower than the transformation point of the constituent material (titanium) of the wristwatch case body 1 and the crown pipe 3, the melting point thereof being at about 604° C. Further, to use this brazing filler metal, an annealing temperature was changed to about 700° C., and an annealing time was set to on the order of one hour. Otherwise, conditions for an annealing process were the same as those for Working Example 1. Incidentally, a wristwatch case 11 manufactured according to Working Example 2 is referred to as a test piece D.

COMPARATIVE EXAMPLE 1

For the purpose of comparison with Working Examples 1 and 2, described as above, a wristwatch case according to a comparative example was manufactured in accordance with a conventional procedure. With this comparative example, use was made of a wristwatch case body and a crown pipe, which constituent materials were the same as those for Working Examples 1 and 2, but differed in dimensions, and brazing with silver solder using silver solder paste (JIS: BAg—8, melting point at 780° C.) was applied thereto, thereby connecting the crown pipe to the wristwatch case body. For this brazing, a brazing temperature was set to about 820° C., and the brazing was applied while the wristwatch case body and the crown pipe were placed in a vacuum furnace for about 10 minutes. However, because the brazing temperature was a temperature close to the transformation point of titanium, crystals in the surface thereof became a little coarser in grain size and turned whitish, so that re-polishing was required. Further, because the wristwatch case body and the crown pipe were not of dimensions enabling the crown pipe to be press-fitted (that is, press-contact does not occur at a face-to-face contact portion between the wristwatch case body and the crown pipe), a solid phase diffusion joining portion could not be formed as in the cases of Working Examples 1 and 2. Incidentally, a wristwatch case manufactured according to Comparative Example 1 is referred to as a test piece A.

COMPARATIVE EXAMPLE 2

With the use of a wristwatch case body and a crown pipe, both being of the same kind as used in Comparative Example 1, projection welding was executed after forming projections (juts) on the crown pipe. Although welding marks are generally visible after welding, in the case of a wristwatch case manufactured according to Comparative Example 2, welded portions of the wristwatch case body and the crown pipe were formed inside a stem hole in such a way as not to be visible from outside. Accordingly, presence of welding marks could not be checked with the naked eye. However, if an extremely small part, such as the crown pipe, is provided with projections, a proportion of the projections to the part in whole becomes high, so that a wristwatch case according to Comparative Example 2 is not regarded excellent in outward decorativeness. Incidentally, the wristwatch case manufactured according to Comparative Example 2 is referred to as a test piece B.

EVALUATION ON WORKING EXAMPLES AND COMPARATIVE EXAMPLES

With reference to the test pieces A to D according to Comparative Examples 1, 2, and Working Examples 1, 2, respectively, as prepared by respective procedures described as above, evaluation on a portion where the crown pipe was fixedly attached to the wristwatch case body was performed in accordance with the following procedure. In this case, there were set four items for evaluation, that is, "corrosion resistance", "waterproof capability", "fixing strength", and "outward appearance".

As to "corrosion resistance", the test piece was immersed in a CASS test solution for 48 hours, and if no corrosion occurred thereto, the same was evaluated as acceptable (based on ISO 3770).

As to "waterproof capability", evaluation on the test piece was made by conducting a waterproof test at 10 atm. in a waterproof test apparatus and conducting a moisture resistancy test by setting relative humidity to 90% at a temperature about 40° C.

As to "fixing strength", the winding crown pipe was pulled by a tensile test machine, and measurement was made on the highest strength (connection strength) at which a connection condition can be maintained.

As to "outward appearance", evaluation was made by visually checking an outward condition of a portion (intimate contact portion) where the wristwatch case body and the crown pipe were connected to each other.

The test pieces A to D according to Comparative Examples 1, 2, and Working Examples 1, 2, respectively, were relatively evaluated in respect of the four items for the evaluation, and results of such evaluation were marked by symbols ○, Δ, X, respectively, in decreasing order of excellence as shown in Table 1.

As indicated in Table 1, with reference to the test piece A according to Comparative Example 1, wherein connection was implemented by the brazing with silver solder, excellent results were obtained in respect of "waterproof capability", "fixing strength", and "outward appearance". However, the test piece A was not found excellent in "corrosion resistance". Furthermore, there was found initiation of considerable rust from portions connected by the silver-alloy brazing, so that it seemed impossible to manufacture a wristwatch in this case.

With reference to the test piece B according to Comparative Example 2, wherein connection was implemented by the projection welding, it was found that the test piece B was low in "waterproof capability" and poor waterproof slightly occurred. Furthermore, since the outside diameter of the crown pipe thereof is large, outward decorativeness was found undesirable.

On the other hand, with reference to the test piece C according to Working Example 1, it was found that both the solid phase diffusion joining portion 4*a* and the brazed connection portion 5*a* were formed, and there was found sufficient connection satisfactory in respect of all the items of "corrosion resistance", "waterproof capability", "fixing strength", and "outward appearance". It is deemed that this is attributable to the following. More specifically, it is deemed that use of the low-melting brazing filler metal contributed to highly excellent corrosion resistance as compared with the case of using a conventional silver solder and so forth, and both the effect of solid phase diffusion at the solid phase diffusion joining portion 4*a* and wettability of the low-melting brazing filler metal contributed to excellent waterproof capability. Further, it is deemed that an increase in connection strength due to tight connection of the face-to-face contact portion, with no gap in-between, occurring at the solid phase diffusion joining portion 4*a*, contributed to excellent fixing strength.

As described in the foregoing, the wristwatch case 11 has sturdiness capable of maintaining the connection condition thereof over a long term as well as excellent waterproof because the respective parts are strongly connected with each other. Further, because connection is implemented by use of the low-melting brazing filler metal, the wristwatch case 11 has excellent corrosion resistance and is excellent in outward decorativeness. Still further, since the wristwatch case 11 can be manufactured by preparing the wristwatch case body 1 and the crown pipe 3 individually, applying the surface processing and film-depositing process to each part, as desired, and subsequently, fixedly attaching both the parts with each other, so that an abundance of design variation can be provided.

Figure 3:
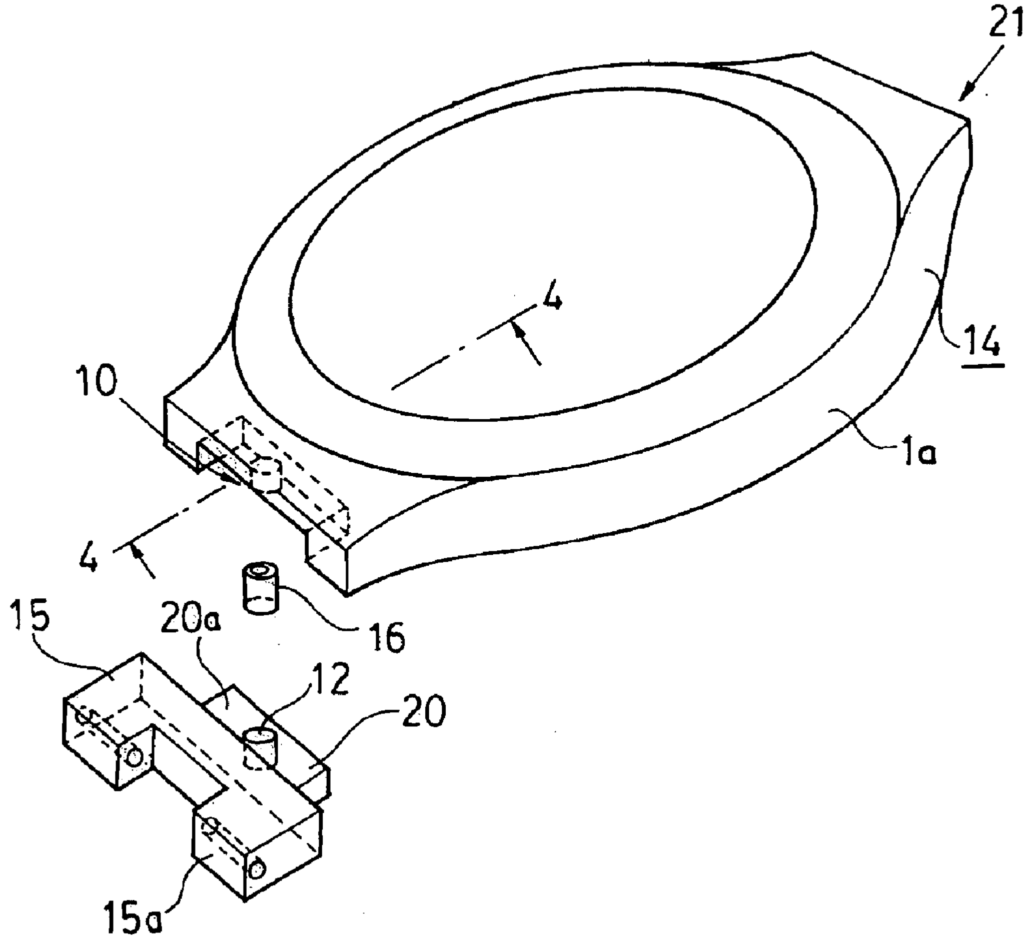
FIG. 3 is a perspective view of another wristwatch case showing a wristwatch case body, an end-piece, and a metal pipe, as exploded.
Figure 4:
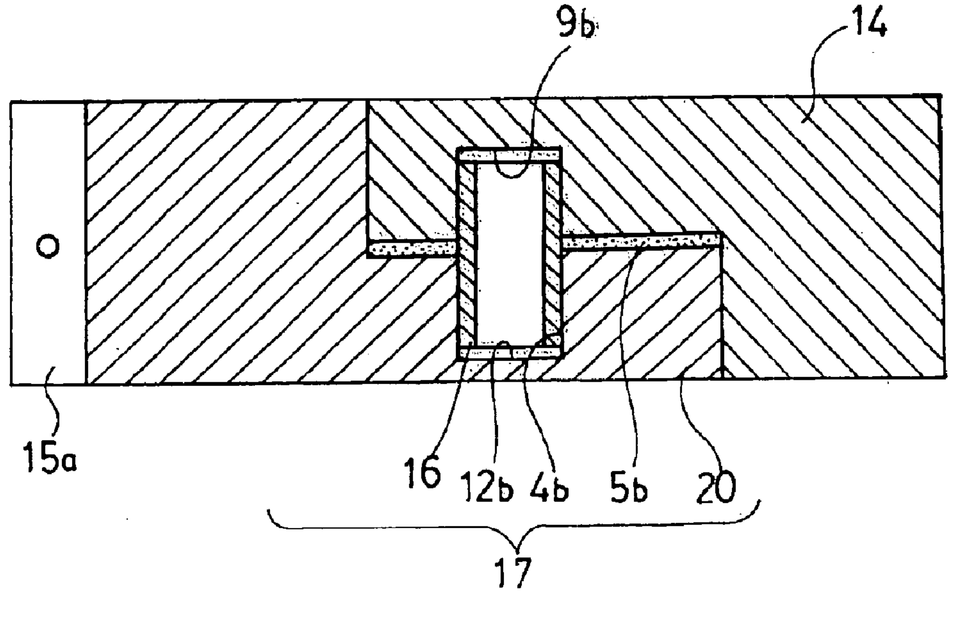
FIG. 4 is a sectional view of the portion formed by bringing the end-piece into intimate contact with the wristwatch case body through the intermediary of the metal pipe, taken on line 4—4 of FIG. 3.
Figure 10:
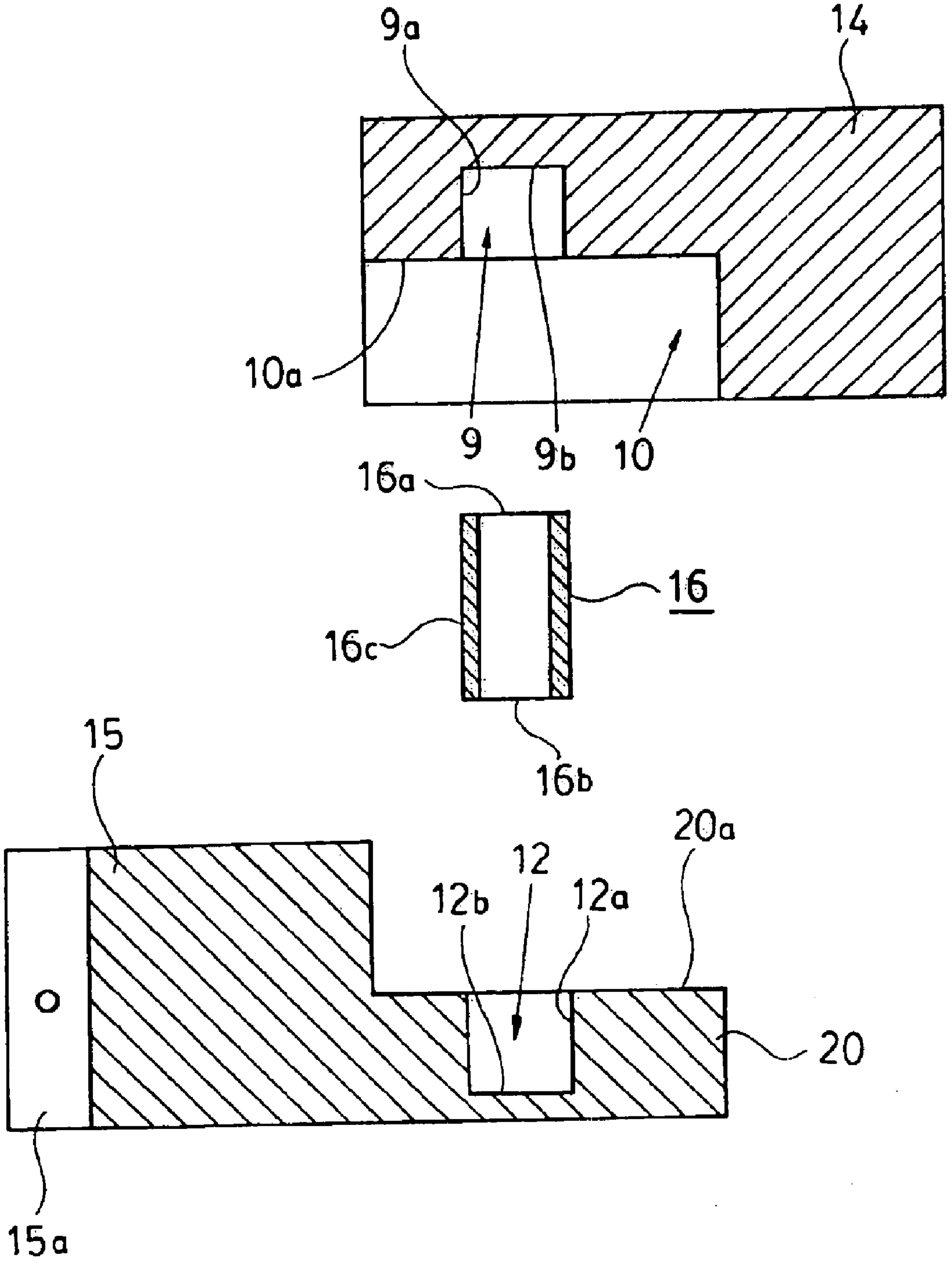
FIG. 10 is a sectional view showing a section taken on line 4—4 of FIG. 3, which is partly omitted.

Second Embodiment (FIGS. 3, 4, AND 10)

1) The whole construction of a decorative article of a wristwatch

Next, as a second embodiment of the invention, a wristwatch case 21 shown in FIG. 3 is described. The wristwatch case 21 is manufactured by fixedly attaching a wristwatch case body 14 as a first part to an end-piece 15 as a second part through the intermediary of a metal pipe 16 as a third part. With the wristwatch case 21, the end-piece 15 is brought into intimate contact with the wristwatch case body 14 through the intermediary of the metal pipe 16 to thereby form a portion 17 where two connection portions, that is, a solid phase diffusion joining portion 4*b* and a brazed connection portion 5*b* are formed. FIG. 3 is a perspective view of the wristwatch case 21 showing the wristwatch case body 14, the end-piece 15, and the metal pipe 16, as exploded. FIG. 4 is a sectional view of the portion 17 formed by bringing the end-piece 15 into intimate contact with the wristwatch case body 14 through the intermediary of the metal pipe 16, taken on line 4—4 of FIG. 3, and FIG. 10 is a sectional view showing a section taken on line 4—4 of FIG. 3, which is partly omitted.

The wristwatch case body 14 is the same in construction as the wristwatch case body 1 except that a cut-out recess 10 is formed in the wristwatch case body 14. In FIG. 3, a stem hole is not shown.

The cut-out recess 10 is formed opposite to a spot of a sidewall portion 1*a* of the wristwatch case body 14, where the stem hole is not formed. The cut-out recess 10 has a butting surface 10*a*, and substantially at the center thereof, there is formed a fitting hole 9. The fitting hole 9 is bored so as to be oriented in a direction orthogonal to the butting surface 10*a*, and has a peripheral wall surface 9*a* and a bottom 9*b*. That is, the fitting hole 9 is not a through-hole.

With the end-piece 15, a protrusion 20 is formed on a side thereof, opposite from a band engagement portion 15*a*. The protrusion 20 is formed so as to correspond to the cut-out recess 10, and has a butting surface 20*a*. And substantially at the center thereof, there is formed a fitting hole 12. The fitting hole 12 is bored so as to be oriented in a direction orthogonal to the butting surface 20*a*, and has a peripheral wall surface 12*a* and a bottom 12*b*. That is, the fitting hole 12 is not a through-hole either.

The fitting hole 9 and the fitting hole 12 are equal to each other in bore and depth, and are formed at respective positions opposing each other when the protrusion 20 is fitted into the cut-out recess 10.

The metal pipe 16 is a cylindrical member having end faces 16*a*, 16*b*, and a peripheral wall surface 16*c*. The metal pipe 16 is formed such that an outside diameter thereof is slightly larger than the bore of the fitting hole 9 as well as the fitting hole 12, and a length thereof is somewhat shorter than the sum of the depth of the fitting hole 9 and that of the fitting hole 12. Accordingly, when the metal pipe 16 is press-fitted into the fitting hole 9 and the fitting hole 12, the peripheral wall surface 16*c* comes into face-to-face contact (is pressed into contact) with the peripheral wall surfaces 9*a*, 12*a*, with stress acting. Further, the metal pipe 16 is disposed such that the end faces 16*a*, 16*b* are opposed to the bottoms 9*b*, 12*b*, respectively, and is fully housed in both the fitting hole 9 and the fitting hole 12 in such a way as to be extended across both the holes.

Further, since the fitting holes 9 and 12 have the bottoms 9*b*, 12*b*, respectively, once the metal pipe 16 is fitted into the fitting hole 9 and the fitting hole 12, the metal pipe 16 is no longer visible from outside. Accordingly, the wristwatch case 21 is excellent in outward decorativeness and is desirable in configuration.

With the wristwatch case 21, the solid phase diffusion joining portion 4*b* is formed at a portion of the portion 17, where the peripheral wall surface 16*c* of the metal pipe 16 is in face-to-face contact with the peripheral wall surfaces

9*a*, 12*a* of the fitting holes 9 and 12. At the solid phase diffusion joining portion 4*b*, a face-to-face contact portion between the peripheral wall surface 16*c* and the peripheral wall surfaces 9*a*, 12*a* undergoes tight and strong connection with no gap in-between.

Further, at the brazed connection portion 5*b*, a low-melting brazing filler metal fed on the butting surface 20*a* melts in an annealing process, and is spread so as to fill up microscopic gaps existing at a face-to-face contact portion between the butting surfaces 20*a* and 10*a*, thereby connecting the end-piece 15 to the wristwatch case body 14.

Thus, with the wristwatch case 21, since the wristwatch case body 14 and the end-piece 15 are strongly connected with each other by virtue of the solid phase diffusion joining portion 4*b*, the wristwatch case 21 has sturdiness capable of maintaining a connection condition of both the parts over a long term. Further, since the brazed connection portion 5*b* is formed with the low-melting brazing filler metal, the wristwatch case 21 has excellent corrosion resistance, and even in case that solid phase diffusion connection is not reliably implemented, the wristwatch case 21 has sturdiness capable of maintaining the connection condition over a long term.

2) A Method of manufacturing the decorative article of the wristwatch

The wristwatch case 21 is manufactured as follows. First, a suitable amount of a low-melting brazing filler metal in a paste state is fed on the butting surface 20*a* of the protrusion 20. Then, while the metal pipe 16 is being fitted into the fitting hole 9 and the fitting hole 12, the protrusion 20 is fitted into the cut-out recess 10, and the end-piece 15 is pushed into the cut-out recess 10 with a strong force applied from outside, whereupon the metal pipe 16 is press-fitted into the fitting holes 9, 12. Further, the butting surface 20*a* and the butting surface 10*a* are opposed to each other. At this point in time, the brazing filler metal fed on the butting surface 20*a* is spread evenly to a degree from a gap formed between the butting surface 20*a* and the butting surface 10*a* throughout a gap formed between the cut-out recess 10 and the protrusion 20. Then, in that state, the wristwatch case body 14, the end-piece 15, and the metal pipe 16 are housed in a hydrogen furnace (not shown), and an annealing process for heating them in a reducing atmosphere is applied, whereupon solid phase diffusion connection and brazing concurrently proceed, so that the wristwatch case body 14 is fixedly attached to the end-piece 15 through the intermediary of the metal pipe 16, thereby integrating these parts with each other.

3) A working example of the decorative article of the wristwatch

Next, a specific working example (sample) of the wristwatch case 21 having such a configuration as described in the foregoing is described hereinafter.

With this working example, a wristwatch case 21 was manufactured by fixedly attaching a wristwatch case body 14 to an end-piece 15, both parts being made of a stainless steel (SUS 316L), through the intermediary of a metal pipe 16 made of a free-cutting stainless steel (SUS 316F). The fitting holes 9, 12 of the wristwatch case body 14 and the end-piece 15, respectively, were about 2 mm ϕ in bore, and the metal pipe 16 was about 2.05 mm ϕ in outside diameter. Accordingly, a press-fit allowance at the time of press-fitting the metal pipe 16 into the fitting holes 9, 12 was 2.05 mm ϕ−2 mm ϕ=0.05 mm ϕ, that is, 50 μm.

The metal pipe 16 was about 4 mm in total length, and the fitting hole 9 and the fitting hole 12 each were 2.1 mm in depth. Accordingly, the sum of the depth of the fitting hole 9 and that of the fitting hole 12 was 4.2 mm. Since the length of the metal pipe 16 is somewhat shorter than the sum of the depths, the metal pipe 16 was completely housed inside the fitting holes 9, 12.

Further, with this working example, in order to form a brazed connection portion 5*b*, use was made of an Au—Ag—Cu—Ge—Pd base brazing filler metal in a paste state, mainly containing gold, silver, copper, germanium, and palladium with a composition ratio of Au:Ag:Cu:Ge:Pd at 45.5:32:5:12.5:5 (wt. %). The brazing filler metal was a low-melting brazing filler metal which melting point is lower than the recrystallization temperature of a constituent material (with this example, stainless steel) of the wristwatch case body 14 and the metal pipe 16, and the melting point thereof is at about 635° C.

Then, for manufacturing the wristwatch case 21, the brazing filler metal was first fed on the butting surface 20*a* by dropping about 2μ liter thereof, using a dispenser. Next, while the metal pipe 16 was being fitted into the fitting hole 9 and the fitting hole 12, the protrusion 20 was press-fitted into the cut-out recess 10, and subsequently, annealing in a hydrogen atmosphere at a high temperature, which is a reducing atmosphere, was applied to the wristwatch case body 14, the end-piece 15, and the metal pipe 16 in a treatment furnace. In this case, an annealing temperature was set to about 850° C., and annealing time was set to about 20 minutes. Thereupon, the two connection portions, namely, a solid phase diffusion joining portion 4*b* and the brazed connection portion 5*b* were formed, so that the wristwatch case body 14, the end-piece 15, and the metal pipe 16 were fixedly attached to one another.

With the solid phase diffusion joining portion 4*b*, at an interface (that is, a face-to-face contact portion between the peripheral wall surface 16*c* and the peripheral wall surfaces 9*a*, 12*a*) where the stainless steel (SUS 316L) as the constituent material of the wristwatch case body 14 and the end-piece 15, is in face-to-face contact with the stainless steel (SUS 316F) as the constituent material of the metal pipe 16, there occurred micro-diffusion of Fe, Cr, Ni, etc. which are all constituent elements of the stainless steels, on an atomic level. As a result, even if there exist microscopic gaps attributable to asperities on the interfaces in the initial stage of connection, such gaps gradually become smaller along with progress in the micro-diffusion and substantially disappeared at the end. Thus, the face-to-face contact portion between the peripheral wall surface 16*c* and the peripheral wall surfaces 9*a*, 12*a* undergoes tight and strong connection with no gap in-between.

Further, at the brazed connection portion 5*b*, the brazing filler metal melted during heating at about 850° C. and is spread so as to fill up microscopic gaps existing at the face-to-face contact portion between the butting surfaces 20*a* and 10*a* due to capillarity. Thereafter, upon cooling of the wristwatch case body 14, the end-piece 15, and the metal pipe 16, the butting surface 20*a* and the butting surface 10*a* are connected with each other.

As is evident from this working example, in the case of connecting metallic parts made of stainless steel, the annealing temperature is preferably in a range of about 600° C. to 900° C. The annealing temperature lower than 600° C. is undesirable because there is a risk that the brazing filler metal does not melt sufficiently and fails to fill up the gaps completely. Also, in that case, there is a possibility that sufficient diffusion does not occur at the solid phase diffusion joining portion 4*a*, and microscopic cavities are left out at the interface thereof, resulting in insufficient strength. On the other hand, the annealing temperature in excess of 900° C. is undesirable either because, the annealing temperature approaches the recrystallization temperature of stainless steel, and the structure of stainless steel becomes coarser, so that the surface condition thereof may change.

Figure 5:
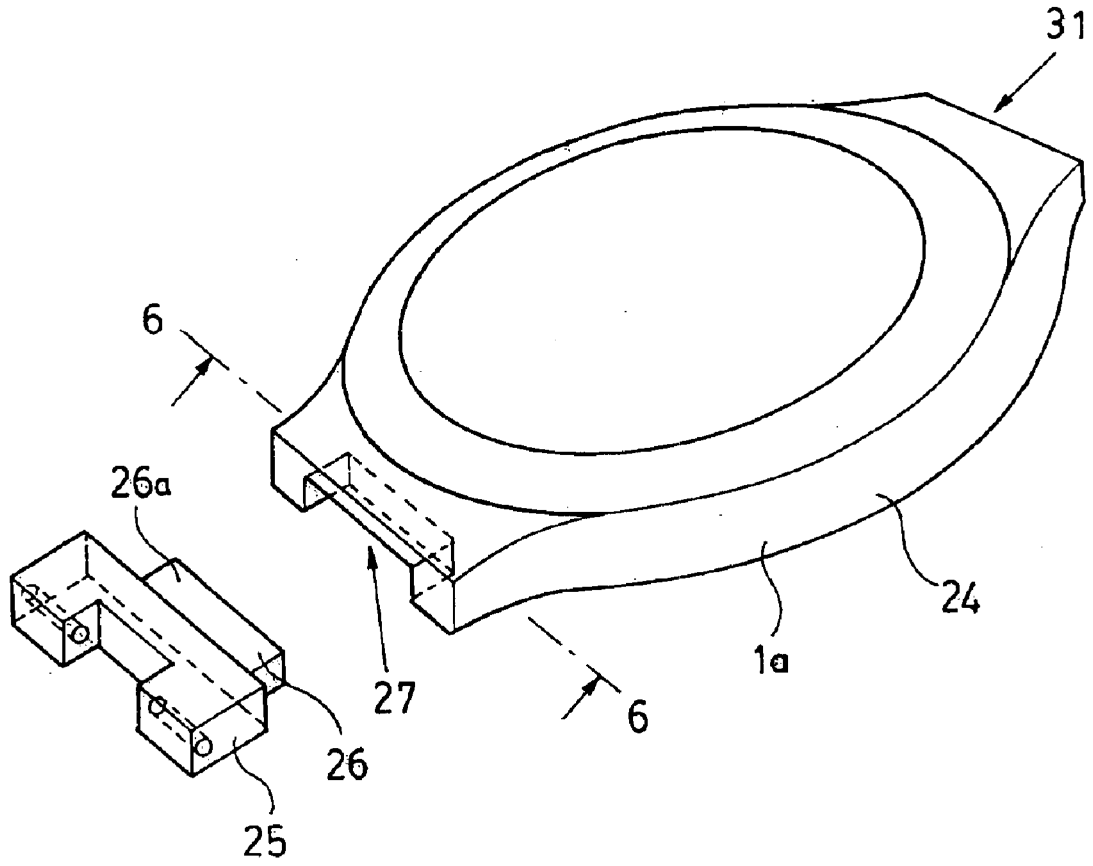
FIG. 5 is a perspective view of still another wristwatch case showing a wristwatch case body and an end-piece, as exploded.
Figure 6:
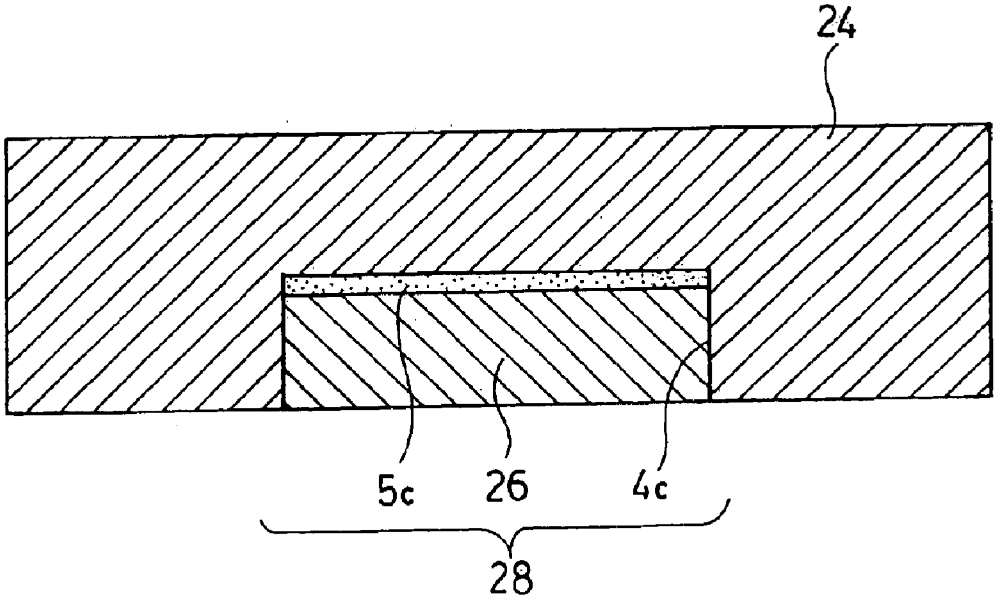
FIG. 6 is a sectional view of the portion formed by bringing the end-piece into intimate contact with the wristwatch case body, taken on line 6—6 of FIG. 5.
Figure 11:
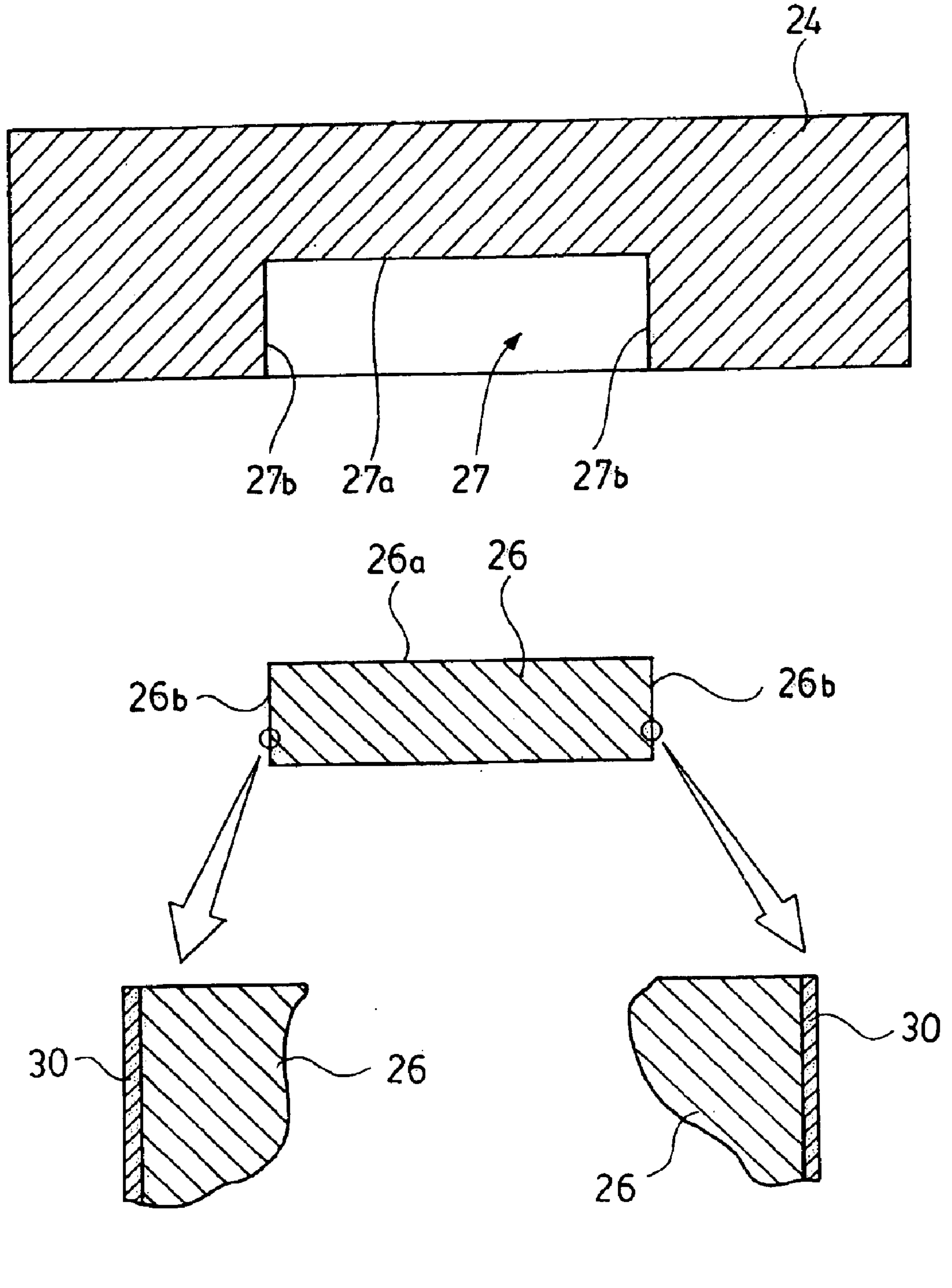
FIG. 11 is a sectional view showing the wristwatch case body as well as the end-piece shown in FIG. 6, as exploded, together with a partly enlarged view of the end-piece.
Figure 12:
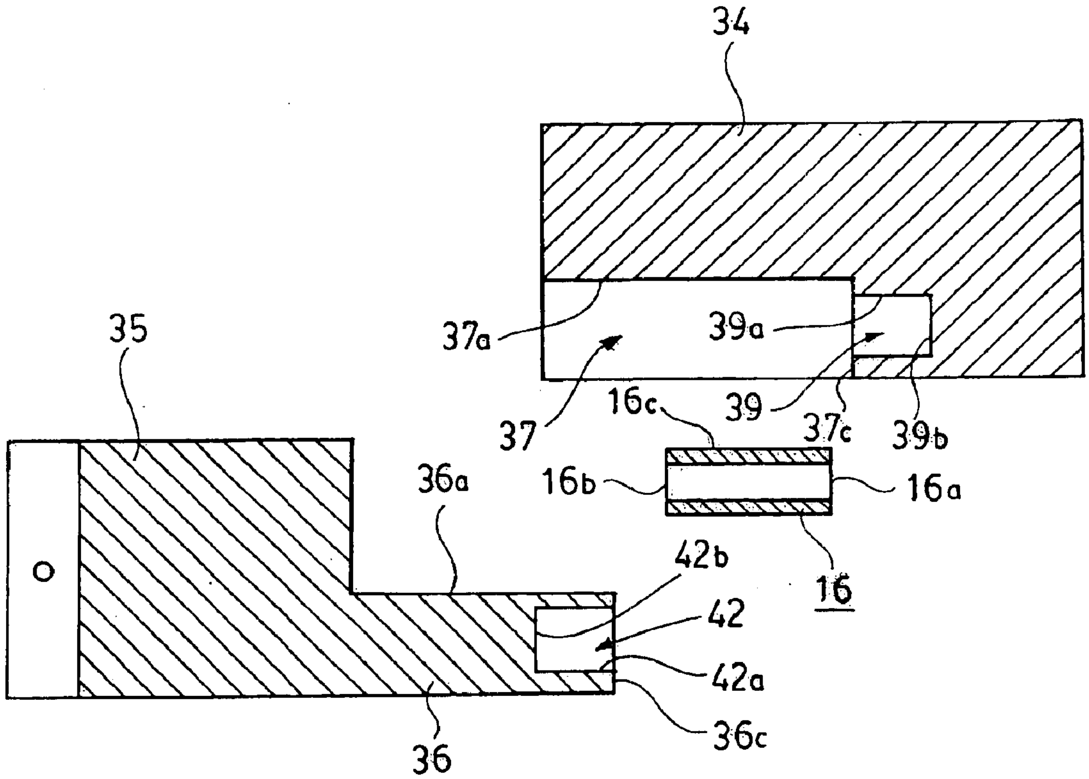
FIG. 12 is a sectional view showing a section taken on line 8—8 of FIG. 7 by partly changing dispositions of respective parts.

Third Embodiment (FIGS. 5, 6, and 11)

1) The Whole Construction of a Decorative Article of a Wristwatch

Subsequently, as a third embodiment of the invention, a wristwatch case 31 shown in FIG. 5 is described. The wristwatch case 31 is manufactured by fixedly attaching a wristwatch case body 24 as a first part and an end-piece 25 as a second part with each other. With the wristwatch case 31, the end-piece 25 is brought into intimate contact with the wristwatch case body 24 to thereby form a portion 28 where solid phase diffusion joining portions 4*c* and a brazed connection portion 5*c* are formed. FIG. 5 is a perspective view of the wristwatch case 31 showing the wristwatch case body 24 and the end-piece 25, as exploded. FIG. 6 is a sectional view of the portion formed by bringing the end-piece 25 into intimate contact with the wristwatch case body 24, taken on line 6—6 of FIG. 5, and FIG. 11 is a sectional view showing the wristwatch case body 24 and the end-piece 25 in FIG. 6, as exploded, together with a partly enlarged view of the end-piece 25.

The wristwatch case body 24 is the same in construction as the wristwatch case body 14 except that no fitting hole is formed in a cut-out recess 27. In FIG. 5 as well, a stem hole is not shown. The cut-out recess 27 has a butting surface 27*a*, and sidewall surfaces 27*b*, 27*b* on both sides thereof.

As compared with the end-piece 15, the end-piece 25 differs therefrom in respect of the shape of a protrusion 26. The protrusion 26 is formed so as to be slightly larger in longitudinal dimension than the cut-out recess 27, having a butting surface 26*a*, and sidewall surfaces 26*b*, 26*b* on both sides thereof. The sidewall surfaces 26*b*, 26*b* each are provided with a metal film 30 deposited thereon. Accordingly, the protrusion 26 is press-fitted into the cut-out recess 27, whereupon the sidewall surfaces 26*b*, 26*b* come into face-to-face contact (are pressed into contact) with the sidewall surfaces 27*b*, 27*b*, respectively, through the intermediary of the metal film 30, with stress acting on the face-to-face contact portion.

With the wristwatch case 31, the solid phase diffusion joining portion 4*c* is formed at each of face-to-face contact portions where the sidewall surfaces 26*b*, 26*b* of the protrusion 26 and the sidewall surfaces 27*b*, 27*b* of the cut-out recess 27 are in face-to-face contact with each other, respectively, through the intermediary of each of the metal films 30, 30. At the solid phase diffusion joining portions 4*c*, there exist the sidewall surfaces 26*b*, 26*b* in a state of face-to-face contact with, and pressed against the sidewall surfaces 27*b*, 27*b*, respectively, through the intermediary of the respective metal films 30 (that is, the sidewall surfaces 26*b*, 26*b* are pressed into contact with the sidewall surfaces 27*b*, 27*b*, respectively, through the intermediary of the respective metal films 30). Further, at interfaces where the respective sidewall surfaces of the protrusion 26 and the cut-out recess 27 are in face-to-face contact with each other, there is formed a diffusion layer of constituent elements {(Ni, P) as constituent elements of stainless steel and the metal films 30, respectively} of the constituent material thereof, and the sidewall surfaces 26*b*, 26*b* are tightly and strongly connected to the sidewall surfaces 27*b*, 27*b*, respectively, with no gap formed in-between, through the intermediary of the respective metal films 30.

Further, at the brazed connection portion 5*c*, a low-melting brazing filler metal fed on the butting surface 26*a* melts in an annealing process, and is spread so as to fill up microscopic gaps existing at a face-to-face contact portion between the butting surfaces 26*a* and 27*a*, thereby connecting the end-piece 25 to the wristwatch case body 24.

Thus, with the wristwatch case 31, since the wristwatch case body 24 and the end-piece 25 are strongly connected with each other by virtue of the solid phase diffusion joining portion 4*c*, the wristwatch case 31 has sturdiness capable of maintaining a connection condition of both the parts over a long term. Further, since the brazed connection portion 5*c* is formed with the low-melting brazing filler metal, the wristwatch case 31 has excellent corrosion resistance, and also has sturdiness capable of maintaining the connection condition over a long term even in case that solid phase diffusion connection is not reliably implemented. Furthermore, since both the solid phase diffusion joining portions 4*c* and the brazed connection portion 5*c* are not visible from outside, the wristwatch case 31 is excellent in outward decorativeness.

Particularly, with the wristwatch case 31, because the solid phase diffusion joining portions 4*c* are formed through the intermediary of the metal films 30, solid phase diffusion characteristics at low temperature are improved as compared with a case where the sidewall surfaces 26*b*, 26*b* are directly in face-to-face contact with the sidewall surfaces 27*b*, 27*b*, so that it is possible to lessen pores at respective interfaces between both the sidewall surfaces. For example, in the case where the protrusion 26 and the wristwatch case body 24 are made of titanium, and the metal films 30 are deposited of copper, or the case where the protrusion 26 and the wristwatch case body 24 are made of stainless steel and the metal films 30 are deposited of palladium, solid phase diffusion characteristics at low temperature are improved as compared with a case where the metal films 30 are not deposited. Further, if the metal films 30 are deposited of a relatively soft metal (Pt, Cu, Au, etc.), plastic deformation occurs upon press-fitting of the protrusion 26, and consequently, stress that can occur at the interfaces is mitigated so as to be substantially evened out throughout the interfaces. Accordingly, microscopic gaps due to difference in roundness, and so forth, are filled up, thereby rendering connection easier.

2) A Method of Manufacturing the Decorative Article of the Wristwatch

The wristwatch case 31 is manufactured as follows. First, the metal film 30 is deposited on the surfaces of the sidewall surfaces 26*b*, 26*b* of the protrusion 26. Next, a suitable amount of the low-melting brazing filler metal in a paste state is fed on the butting surface 26*a*. Then, the protrusion 26 is fitted in the cut-out recess 27 from outside, and the end-piece 25 is pushed into the cut-out recess 27 with a strong force applied from outside, whereupon the protrusion 26 is press-fitted into the cut-out recess 27. Then, the butting surface 26*a* and the butting surface 27*a* are opposed to each other. At this point in time, the brazing filler metal fed on the butting surface 26*a* is spread evenly to a degree in a gap formed between the butting surface 26*a* and the butting surface 27*a*. Then, in that state, the wristwatch case body 24 and the end-piece 25 are placed in a vacuum apparatus (not shown), and an annealing process for heating them in a vacuum atmosphere is applied, whereupon solid phase diffusion connection and brazing concurrently proceed, so that the wristwatch case body 24 and the end-piece 25 are fixedly attached to each other to be thereby integrated.

3) A Working Example of the Decorative Article of the Wristwatch

Next, a specific working example (sample) of the wristwatch case 31 having such a construction as described in the foregoing is described hereinafter.

With this working example, a wristwatch case 31 was manufactured by fixedly attaching a wristwatch case body 24 and an end-piece 25, both being made of a stainless steel (SUS 304), with each other. With the wristwatch case body 24, a cut-out recess 27 was about 10 mm in longitudinal dimension, and the end-piece 25 had a protrusion 26 about 10.05 mm in longitudinal dimension. Accordingly, a press-fit allowance at the time of press-fitting the protrusion 26 into the cut-out recess 27 was about 10.05 mm−10 mm=0.05 mm ϕ, that is, 50 $\mu$m.

Sidewall surfaces 26*b*, 26*b* of the protrusion 26 were each provided with a Ni—P plating film to serve as a metal film 30, deposited thereon beforehand by masking plating. The film had a thickness about 3 $\mu$m.

Further, with this working example, in order to form a brazed connection portion 5*b*, use was made of a brazing filler metal mainly containing gold, silver, copper, palladium, and nickel together with at least one or more elements selected from the group consisting of gallium, indium, and tin. In this case, use was made of an Au—Ag—Cu—Pd—Ni—Ga—In base brazing filler metal in a paste state, containing gallium and indium, as additional major constituents, and with a composition ratio of Au:Ag:Cu:Pd:Ni:Ga:In at 41:30:8:10:4:4:3 (wt. %). The brazing filler metal is a low-melting brazing filler metal which melting point is lower than the recrystallization temperature of the constituent material (stainless) of the wristwatch case body 24 and the end-piece 25, and the melting point thereof is at about 605° C.

Then, for manufacturing the wristwatch case 31, the brazing filler metal was first fed on the butting surface 26*a* by dropping about 2$\mu$ liter thereof, using a dispenser. Next, after press-fitting the protrusion 26 in the cut-out recess 27, the wristwatch case body 24, together with the end-piece 25, was housed in a vacuum apparatus, and a pressure inside the vacuum apparatus was maintained at around $5\times10^{-5}$ Torr (about $6.7\times10^{-3}$ Pa) to produce a vacuum atmosphere, in which annealing was applied. An annealing temperature at this time was set to about 800° C., and annealing time was set to about 30 minutes. As a result, the solid phase diffusion joining portions 4*c* and the brazed connection portion 5*c* were concurrently formed, whereupon the end-piece 25 was fixedly attached to the wristwatch case body 24.

The wristwatch case 31 obtained as above can be manufactured by applying honing to the visible surface of the wristwatch case body 24, except a portion thereof, around the portion 28, beforehand, and applying mirror finishing to the surface of the end-piece 25, thereby fixedly attaching both parts with each other. By so doing, with the wristwatch case 31 manufactured by the above-described procedure, a honed surface of the wristwatch case body 24 is adjacent to a mirror-like surface of the end-piece 25 with a sharp interface therebetween, so that a novel design can be obtained, thereby providing design variation in abundance.

As with this working example, in the case of connecting stainless steel to stainless steel, if the annealing temperature is set to around 800° C., surface roughness due to recrystallization does not occur, so that connection can be implemented with a surface condition as it is.

Further, the CASS test as an artificial sweat test was conducted on the wristwatch case 31 for 48 hours to evaluate discoloration, initiation of rust, etc., however, test results were found satisfactory. That is, the intimate contact portion 28 was found excellent in corrosion resistance. This is because particular elements causing corrosion are not included in the portion 28 (constituent materials of the wristwatch case body 24, and the end-piece 25, and the constituent material of the metal films 30).

In the foregoing description, the Ni—P film is used as the metal films 30, however, a film deposited of Pd, Pt, Cu, Ni, Au, or alloy thereof may be used instead. Further, as to a method of depositing the films, use may be made of vapor deposition, IP (ion plating), sputtering, or CVD besides a plating method. Further, when depositing the metal film 30 on the sidewall surfaces 26*b*, 26*b* only, a mask may be deposited on unnecessary portions other than those sidewall surfaces to be lifted off thereafter, or after depositing a film on the entire surface, etching may be applied to unnecessary portions (portions other than the sidewall surfaces 26*b*, 26*b*) to be thereby removed.

Still further, the brazed connection portion 5*c* may be formed by depositing the same metal film as the metal film 30 on the butting surface 26*a*. In such a case, the wettability of the brazing filler metal can be improved to thereby lessen flow of the brazing filler metal (solder flow). In this connection, the wettability of the brazing filler metal is generally affected by an annealing temperature (the higher the temperature, the better the wettability becomes).

Fourth Embodiment (FIGS. 7, 8, 12 and 13)

1) The Whole Construction of a Decorative Article of a Wristwatch

Figure 7:
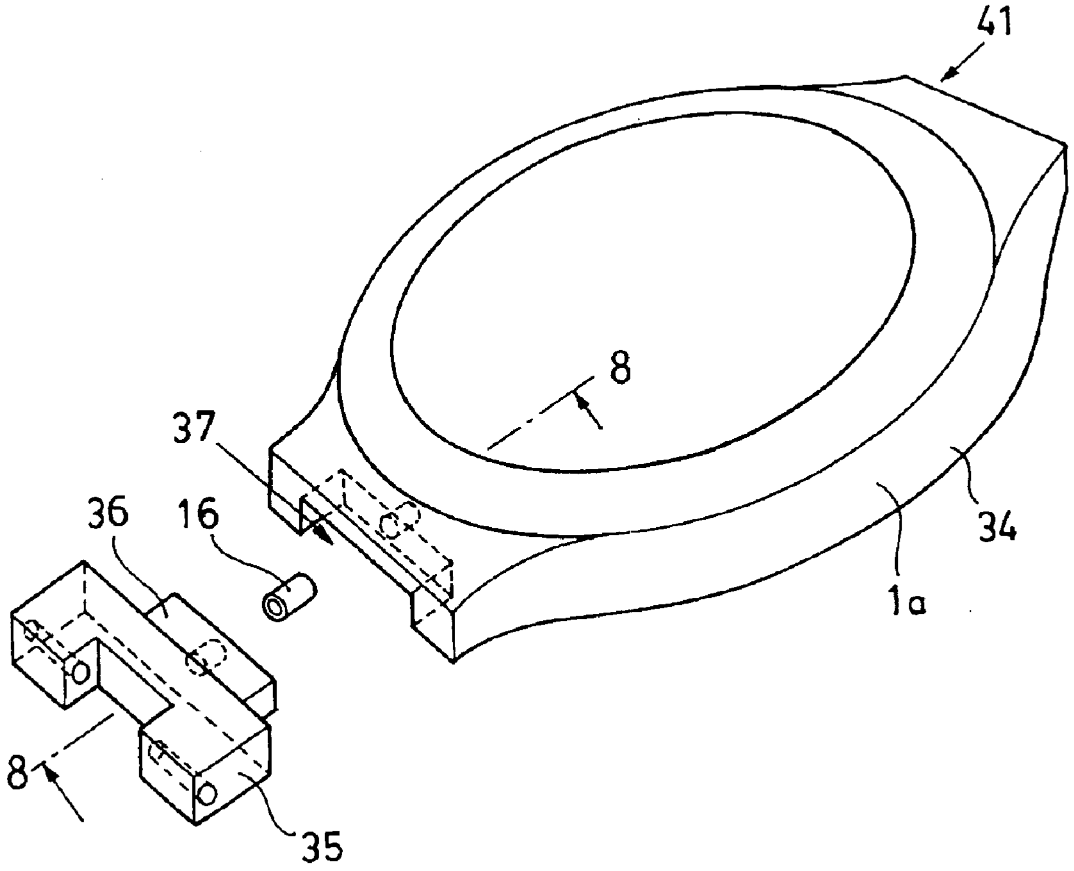
FIG. 7 is a perspective view of yet another wristwatch case showing a wristwatch case body, an end-piece, and a metal pipe, as exploded.
Figure 8:
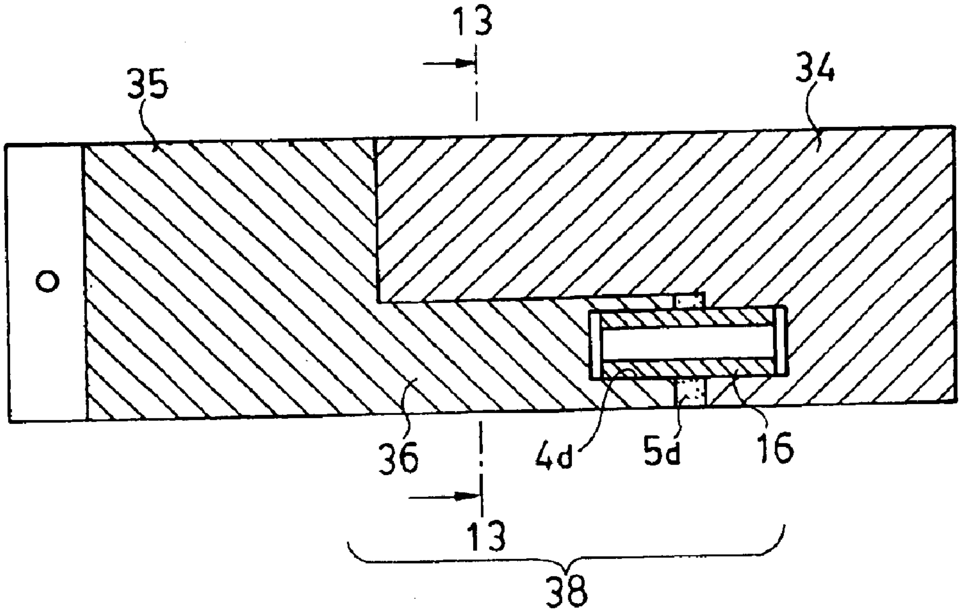
FIG. 8 is a sectional view of the portion formed by bringing the end-piece into intimate contact with the wristwatch case body through the intermediary of the metal pipe, taken on line 8—8 of FIG. 7.
Figure 13:
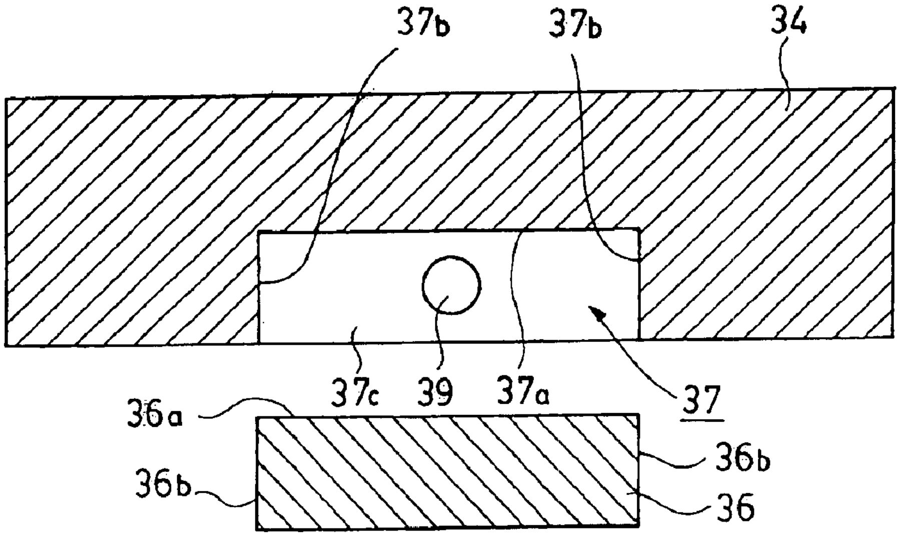
FIG. 13 is a sectional view taken on line 13—13 of FIG. 8, showing a portion forming the portion of the wristwatch case body and the end-piece, shown in FIG. 7.

Subsequently, as a fourth embodiment of the invention, a wristwatch case 41 shown in FIG. 7 is described. The wristwatch case 41 is manufactured by fixedly attaching a wristwatch case body 34 as a first part and an end-piece 35 as a second part with each other through the intermediary of a metal pipe 16. With the wristwatch case 41, the end-piece 35 thereof is brought into intimate contact with the wristwatch case body 34 through the intermediary of the metal pipe 16 to thereby form a intimate contact portion 38 where two connection portions, that is, a solid phase diffusion joining portion 4*d* and a brazed connection portion 5*d* are formed. FIG. 7 is a perspective view of the wristwatch case 41 showing the wristwatch case body 34, the end-piece 35, and the metal pipe 16, as exploded. FIG. 8 is a sectional view of the intimate contact portion 38 formed by bringing the end-piece 35 into intimate contact with the wristwatch case body 34 through the intermediary of the metal pipe 16, taken on line 8—8 of FIG. 7, and FIG. 13 is a sectional view showing a portion forming the intimate contact portion of the wristwatch case body 34 and the end-piece 35, shown in FIG. 7, taken on line 13—13 of FIG. 8.

The wristwatch case body 34 is the same in construction as the wristwatch case body 14 except a way in which a cut-out recess 37 is formed. The cut-out recess 37 is the same as the cut-out recess 10 except that a fitting hole 39 is formed at a different position. In FIG. 7 as well, a stem hole is not shown. The cut-out recess 37 has a butting surface 37*a*, sidewall surfaces 37*b*, 37*b* and a rear surface 37*c*, and substantially at the center of the rear surface 37*c*, a fitting hole 39 is formed. The fitting hole 39 is bored so as to oriented in a direction orthogonal to the rear surface 37*c*, having a peripheral sidewall surface 39*a* and a bottom 39*b*.

With the end-piece 35, a protrusion 36 is formed. The protrusion 36 is formed so as to be slightly larger in longitudinal dimension than the cut-out recess 37. Accordingly, the protrusion 36 is press-fitted into the cut-out recess 37, whereupon sidewall surfaces 36*b*, 36*b* of the protrusion 36 come into face-to-face contact (are pressed into contact) with the sidewall surfaces 37*b*, 37*b*, respectively, with stress acting. The protrusion 36 has a butting surface 36*a*, the sidewall surfaces 36*b*, 36*b*, and a front surface 36*c*, and substantially at the center of the front surface 36*c*, there is formed a fitting hole 42. The fitting hole 42 is bored so as to be oriented in a direction orthogonal to the front surface 36*c*, and has a peripheral wall surface 42*a* and a bottom 42*b*.

The fitting hole 39 and the fitting hole 42 are equal to each other in bore and depth, and are formed at respective positions opposing each other when the protrusion 36 is fitted into the cut-out recess 37.

Because the metal pipe 16 has an outside diameter somewhat larger than the bore of the fitting hole 39 as well as the fitting hole 42, when the metal pipe 16 is press-fitted into the fitting hole 39 and the fitting hole 42, a peripheral wall surface 16*c* of the metal pipe 16 comes into face-to-face contact (is pressed into contact) with the peripheral wall surfaces 39*a*, 42*a*, with stress acting. Further, since the metal pipe 16 is shorter in length than the sum of a depth of the fitting hole 39 and that of the fitting hole 42, the metal pipe 16 is disposed such that end faces 16*a*, 16*b* thereof are opposed to the bottoms 39*b*, 42*b*, respectively, and is fully housed in the fitting holes 39 and 42 in such a way as to be extended across both the holes.

With the wristwatch case 41, a solid phase diffusion joining portion 4*d* is formed in the following portions. More specifically, the solid phase diffusion joining portion 4*d* is formed in a portion of the intimate contact portion 38, where the peripheral wall surface 16*c* of the metal pipe 16 is in face-to-face contact with the peripheral wall surfaces 39*a*, 42*a* of the fitting holes 39, 42, respectively, and in portions of the intimate contact portion 38, where the sidewall surfaces 36*b*, 36*b* of the protrusion 36 are in face-to-face contact with the sidewall surfaces 37*b*, 37*b* of the cut-out recess 37, respectively. At respective face-to-face contact portions of the solid phase diffusion joining portions 4*d*, there occurs micro-diffusion of constituent elements of respective constituent materials of those parts, on an atomic level, so that microscopic gaps are substantially eliminated. Thus, the face-to-face contact portions between the sidewall surfaces 36*b*, 36*b* and the sidewall surfaces 37*b*, 37*b*, respectively, as well as the face-to-face contact portion between the peripheral wall surface 16*c*, and the respective peripheral wall surfaces 39*a*, 42*a* undergo tight and strong connection with no gap in-between.

Further, at the brazed connection portion 5*d*, a low-melting brazing filler metal fed on the front surface 36*c* melts in an annealing process and is spread so as to fill up microscopic gaps existing at a face-to-face contact portion between the front surface 36*c* and the rear surface 37*c*, thereby connecting the end-piece 35 to the wristwatch case body 34.

Thus, with the wristwatch case 41, since the wristwatch case body 34 and the end-piece 35 are strongly connected with each other by virtue of the solid phase diffusion joining portions 4*d*, the wristwatch case 41 has sturdiness capable of maintaining a connection condition of both the parts over a long term. Further, since the brazed connection portion 5*d* is formed with the low-melting brazing filler metal, the wristwatch case 41 has excellent corrosion resistance, and even in case that solid phase diffusion connection is not reliably implemented, the wristwatch case 41 has sturdiness capable of maintaining the connection condition over a long term.

2) A Method of Manufacturing the Decorative Article of the Wristwatch

The wristwatch case 41 is manufactured as follows. First, a suitable amount of a low-melting brazing filler metal in a paste state is fed on the front surface 36*c* of the protrusion 36 beforehand. Then, while the metal pipe 16 is being fitted into the fitting holes 39, 42, the protrusion 36 is fitted into the cut-out recess 37, and the end-piece 35 is pushed into the cut-out recess 37 with a strong force applied from outside, whereupon the metal pipe 16 is press-fitted into the wristwatch case body 34 and the end-piece 35. Then, the front surface 36*c* and the rear surface 37*c* are opposed to each other. At this point in time, the brazing filler metal fed on the front surface 36*c* is spread evenly to a degree in a gap formed between the front surface 36*c* and the rear surface 37c. And the protrusion 36 is press-fitted into the cut-out recess 37. Then, in that state, the wristwatch case body 34, the end-piece 35, and the metal pipe 16 are housed in a vacuum apparatus (not shown), and an annealing process for heating them in a vacuum atmosphere is applied, whereupon solid phase diffusion joining and brazed connection proceed, so that the wristwatch case body 34 is fixedly attached to the end-piece 35 through the intermediary of the metal pipe 16, thereby integrating these parts with each other.

3) A Working Example of the Decorative Article of the Wristwatch

Next, a specific working example (sample) of the wristwatch case 41 having such a construction as described in the foregoing is described hereinafter.

With this working example, a wristwatch case 41 was manufactured by fixedly attaching a wristwatch case body 34 and an end-piece 35, both parts being made of a stainless steel (SUS 304), to a metal pipe 16 made of a free-cutting stainless steel (SUS 316F). The fitting holes 39, 42, of the wristwatch case body 34 and the end-piece 35, respectively, were about 1.80 mm ϕ in bore, and the metal pipe 16 was about 1.85 mm ϕ in outside diameter. Accordingly, a press-fit allowance at the time of press-fitting the metal pipe 16 into the fitting holes 39, 42 was 1.85 mm−1.80 mm=0.05 mm ϕ, that is, 50 $\mu$m.

The metal pipe 16 was about 4 mm in total length, and the fitting holes 39, 42 each were 2.1 mm in depth. Accordingly, the sum of the depth of the fitting hole 39 and that of the fitting hole 42 was 4.2 mm. Since the length of the metal pipe 16 is somewhat shorter than the sum of the depths, the metal pipe 16 was completely housed inside the fitting holes 39, 42.

The protrusion 36 was about 10.05 mm in longitudinal dimension while the cut-out recess 37 was about 10.00 mm in longitudinal dimension. Accordingly, a press-fit allowance at the time of press-fitting the protrusion 36 into the cut-out recess 37 was 10.05 mm−10.00 mm=0.05 mm, that is, 50 $\mu$m.

With this working example, in order to form a brazed connection portion 5*d*, use was made of a brazing filler metal mainly containing gold, silver, copper, palladium, and nickel together with at least one or more elements selected from the group consisting of gallium, indium, and tin. In this case, use was made of an Au—Ag—Cu—Pd—Ni—In—Sn base brazing filler metal in a paste state, containing indium and tin, as additional major constituents, and with a composition ratio of Au:Ag:Cu:Pd:Ni:In:Sn at 56:18:8:5:5:3:5 (wt. %). The brazing filler metal was a low-melting brazing filler metal which melting point is lower than the recrystallization temperature of the constituent material (stainless) of the wristwatch case body 34 and the end-piece 35, and the melting point thereof is at about 660° C.

Then, for manufacturing the wristwatch case 41, the brazing filler metal was first fed on the front surface 36*c* by dropping about 2$\mu$ liter thereof, using a dispenser. Next, after press-fitting the protrusion 36 in the cut-out recess 37 while the metal pipe 16 is being fitted into the fitting holes 39, 42, the wristwatch case body 34, together with the end-piece 35, was housed in a vacuum apparatus, and a pressure inside the vacuum apparatus was maintained at around $5\times10^{-5}$ Torr (about $6.7\times10^{-3}$ Pa) to produce a vacuum atmosphere, in which annealing was applied. An annealing temperature at this time was set to about 800° C., and annealing time was set to about 30 minutes. As a result, two connection portions, namely, a solid phase diffusion joining portion 4*d* and a brazed connection portion 5*d* were concurrently formed, whereupon the end-piece 35 was fixedly attached to the wristwatch case body 34.

The wristwatch case 41 obtained as above can be manufactured by applying honing to the visible surface of the wristwatch case body 34 except a portion around the intimate contact portion 38, beforehand, and applying mirror finishing to the surface of the end-piece 35, then fixedly attaching both parts with each other. By so doing, with the wristwatch case 41 manufactured by the above-described procedure, a honed surface of the wristwatch case body 34 is adjacent to a mirror-like surface of the end-piece 35 with a sharp interface therebetween, so that a novel design can be obtained, thereby providing design variation in abundance.

Further, the CASS test was conducted on the wristwatch case 41 in accordance with the same procedure as for the third embodiment, and test results were found satisfactory. This is because particular elements causing corrosion are not included at the interfaces of connection.

As with this working example, in the case of connecting stainless steel to stainless steel, the annealing temperature may be the same as that for the third embodiment.

With the respective embodiments described hereinbefore, there have been described the wristwatch cases as decorative articles of a wristwatch, manufactured by fixedly attaching a crown pipe to a wristwatch case body, and by fixedly attaching an end-piece to the wristwatch case body, respectively, by way of example, however, the decorative article of the wristwatch according to the invention, is not limited thereto. For example, the present invention is also applicable to a decorative article of a wristwatch manufactured by fixedly attaching a back cover to a wristwatch case body, a decorative article of a wristwatch manufactured by fixedly attaching a bezel to a wristwatch case body, a decorative article of a wristwatch manufactured by fixedly attaching a back cover to a casing ring, a decorative article of a wristwatch manufactured by fixedly attaching band parts together, and so forth.

Further, with the respective embodiments described hereinbefore, use has been made of the brazing filler metal composed of Pd—Pt—Ni—P, Pd—Cu—Ni—P, Au—Ag—Cu—Ge—Pd, Au—Ag—Cu—Pd—Ni—Ga—In, and Au—Ag—Cu—Pd—Ni—In—Sn, respectively, as the low-melting brazing filler metal, however, the low-melting brazing filler metal is not limited thereto. For example, use may be made of a brazing filler metal composed of Pd—Cu—Pt—Ni—P, or a brazing filler metal composed of Au—Ag—Cu—Pd—Ni—Ga—Sn as Au—Ag—Cu—Pd—Ni with addition of one or more element selected from the group consisting of Ga, In, and Sn.

TABLE 1

| | Corrosion resistance | Waterproof capability | Fixing force | Outward appearance |
|---|---|---|---|---|
| Comparative Example 1, Test piece A Conventional procedure Brazing with silver solder | X | ○ | ○ | Δ |
| Comparative Example 2, Test piece B Conventional procedure Projection welding | ○ | Δ | ○ | X |
| Example 1, Test piece C Solid phase diffusion joining and Brazed connection | ○ | ○ | ○ | ○ |
| Example 2, Test piece D Solid phase diffusion joining and Brazed connection | ○ | ○ | ○ | ○ |

INDUSTRIAL APPLICABILITY

With the invention, tight and strong connection with no gap is implemented at the face-to-face contact portions between respective parts, making up the solid phase diffusion joining portions, respectively, and in addition, the respective parts are connected with each other by the brazed connection portion, so that it is possible to provide a decorative article of a wristwatch, having sturdiness capable of maintaining the connection condition thereof over a long term as well as excellent corrosion resistance and waterproof. Further, since it is possible to manufacture the decorative article of the wristwatch by preparing the respective parts individually, and applying a finishing process as desired thereto, respectively, thereby fixedly attaching the respective parts with each other, not only visual decorativeness is kept in excellent state but also an abundance of design variation can be provided.

What is claimed is:

1. A decorative article of a wristwatch, having a construction in which a first part is fixedly attached to a second part, wherein a solid phase diffusion joining portion and a brazed connection portion are formed in a portion where the second part is in intimate contact with the first part.

2. The decorative article of a wristwatch according to claim 1, wherein the constituent material of the first part and the second part, respectively, is either stainless steel or titanium.

3. The decorative article of a wristwatch according to claim 1, wherein the first part is a wristwatch case body and the second part is a crown pipe.

4. The decorative article of a wristwatch according to claim 1, wherein the first part is a wristwatch case body and the second part is an end-piece.

5. The decorative article of a wristwatch according to claim 1, wherein the brazed connection portion is formed with a low-melting brazing filler metal.

6. The decorative article of a wristwatch according to claim 1, wherein the brazed connection portion is formed with a brazing filler metal mainly containing palladium, platinum, nickel, and phosphorus or a brazing filler metal mainly containing palladium, copper, nickel, and phosphorus.

7. The decorative article of a wristwatch according to claim 1, wherein the brazed connection portion is formed with a brazing filler metal mainly containing gold, silver, copper, germanium, and palladium.

8. The decorative article of a wristwatch according to claim 1, wherein the brazed connection portion is formed with a brazing filler metal mainly containing gold, silver, copper, palladium, and nickel with addition of at least one or more elements selected from the group consisting of gallium, indium, and tin.

9. A decorative article of a wristwatch, having a construction in which a first part is fixedly attached to a second part,
 wherein a hole portion corresponding to the second part is formed in the first part, and
 a solid phase diffusion joining portion and a brazed connection portion are formed in a portion where the second part is fitted into, and is in intimate contact with the hole portion.

10. The decorative article of a wristwatch according to claim 9,
 wherein the second part has a small diameter portion while the hole portion has a small diameter portion corresponding to the small diameter portion of the second part, and
 the solid phase diffusion joining portion is formed in a portion where the small diameter portion of the second part is in intimate contact with the small diameter portion of the hole portion, the brazed connection portion being formed in a portion other than the portion where the small diameter portion of the second part is in intimate contact with the small diameter portion of the hole portion.

11. The decorative article of a wristwatch according to claim 9, wherein the constituent material of the first part and the second part, respectively, is either stainless steel or titanium.

12. A decorative article of a wristwatch according to claim 9, wherein the first part is a wristwatch case body and the second part is a crown pipe.

13. The decorative article of a wristwatch according to claim 9, wherein the brazed connection portion is formed with a low-melting brazing filler metal.

14. The decorative article of a wristwatch according to claim 9, wherein the brazed connection portion is formed with a brazing filler metal mainly containing palladium, platinum, nickel, and phosphorus or a brazing filler metal mainly containing palladium, copper, nickel, and phosphorus.

15. A decorative article of a wristwatch, having a construction in which a first part is fixedly attached to a second part,
 wherein a recess is formed in the first part while a protrusion corresponding to the recess is formed in the second part, and
 a solid phase diffusion joining portion and a brazed connection portion are formed in a portion where the protrusion is fitted into, and is in intimate contact with the recess.

16. The decorative article of a wristwatch according to claim 15, further comprising:
 a third part in intimate contact with the recess and the protrusion, wherein the solid phase diffusion joining portion is formed in a portion where the third part is in intimate contact with the recess and the protrusion, respectively, while the brazed connection portion is formed in a portion where the protrusion is in intimate contact with the recess.

17. The decorative article of a wristwatch according to claim 15,
 wherein a metal film is deposited on respective surfaces of the protrusion, and the protrusion is in intimate contact with the recess through the intermediary of the respective metal films.

18. The decorative article of a wristwatch according to claim 15, wherein the constituent material of the first part and the second part, respectively, is either stainless steel or titanium.

19. The decorative article of a wristwatch according to claim 15, wherein the first part is a wristwatch case body and the second part is an end-piece.

20. The decorative article of a wristwatch according to claim 15, wherein the brazed connection portion is formed with a low-melting brazing filler metal.

21. The decorative article of a wristwatch according to claim 15, wherein the brazed connection portion is formed with a brazing filler metal mainly containing gold, silver, copper, germanium, and palladium.

22. The decorative article of a wristwatch according to claim 4, wherein the brazed connection portion is formed with a brazing filler metal mainly containing gold, silver, copper, palladium, and nickel with addition of at least one or more elements selected from the group consisting of gallium, indium, and tin.

23. A method of manufacturing a decorative article of a wristwatch by fixedly attaching a first part to a second part, said method comprising:
 a step of feeding a brazing filler metal on the second part; and
 a step of forming a solid phase diffusion joining portion and a brazed connection portion in a portion where the second part is in intimate contact with the first part.

24. The method of manufacturing a decorative article of a wristwatch according to claim 23, wherein the step of feeding the brazing filler metal is executed by feeding the brazing filler metal in a paste state by use of a dispenser.

25. The method of manufacturing a decorative article of a wristwatch according to claim 23,
 wherein titanium is used as the constituent material of the first part and the second part, and
 a temperature for heating in an annealing step is in a range of about 600° C. to 850° C.

26. The method of manufacturing a decorative article of a wristwatch according to claim 23,
 wherein stainless steel is used as the constituent material of the first part and the second part, and
 a temperature for heating in an annealing step is in a range of about 600° C. to 900° C.

27. A method of manufacturing a decorative article of a wristwatch by fixedly attaching a first part to a second part, said method comprising:
 a step of feeding a brazing filler metal on the second part;
 a press-contact step of pressing a portion of the second part, other than a portion thereof, with the brazing filler metal fed thereon, into contact with the first part;
 a face-to-face contact step of bringing the portion of the second part, with the brazing filler metal fed thereon, into face-to-face contact with the first part; and
 an annealing step of heating the first part and second part after the press-contact step and the face-to-face contact step.

28. A method of manufacturing a decorative article of a wristwatch according to claim 27, wherein the press-contact step is executed by press-fitting the second part into the first part.

29. The method of manufacturing a decorative article of a wristwatch according to claim 27, wherein the step of feeding the brazing filler metal is executed by feeding the brazing filler metal in a paste state by use of a dispenser.

30. The method of manufacturing a decorative article of a wristwatch according to claim 27, wherein titanium is used as the constituent material of the first part, and the second part, and a temperature for heating in the annealing step is in a range of about 600° C. to 850° C.

31. The method of manufacturing a decorative article of a wristwatch, according to claim 27, wherein stainless steel is used as the constituent material of the first part and the second part, and a temperature for heating in the annealing step is in a range of about 600° C. to 900° C.

32. The method of manufacturing a decorative article of a wristwatch according to claim 27, further comprising:

a step of depositing a metal film on a portion of the second part, other than the portion thereof on which the brazing filler metal is to be fed, prior to the step of feeding the brazing filler metal on the second part.

33. A method of manufacturing a decorative article of a wristwatch by fixedly attaching a first part to a second part, said method comprising:

a step of feeding a brazing filler metal on the second part;

a press-contact step of pressing a third part into contact with a portion of the second part, other than a portion thereof, with the brazing filler metal fed thereon, and with the first part;

a face-to-face contact step of bringing the portion of the second part, with the brazing filler metal fed thereon, into face-to-face contact with the first part; and an annealing step of heating the first part, second part, and third part after the press-contact step and the face-to-face contact step.

34. The method of manufacturing a decorative article of a wristwatch according to claim 33, wherein the press-contact step is executed by press-fitting the third part into the first part and second part.

35. The method of manufacturing a decorative article of a wristwatch according to claim 33, wherein the step of feeding the brazing filler metal is executed by feeding the brazing filler metal in a paste state by use of a dispenser.

36. The method of manufacturing a decorative article of a wristwatch according to claim 33, wherein titanium is used as the constituent material of the first part and the second part, and a temperature for heating in the annealing step is in a range of about 600° C. to 850° C.

37. The method of manufacturing a decorative article of a wristwatch according to claim 33, wherein stainless steel is used as the constituent material of the first part and the second part, and a temperature for heating in the annealing step is in a range of about 600° C. to 900° C.

* * * * *